(12) United States Patent
Sakakima et al.

(10) Patent No.: US 8,316,403 B2
(45) Date of Patent: Nov. 20, 2012

(54) RECEIVING APPARATUS AND CONTROL METHOD THEREOF

(75) Inventors: Eito Sakakima, Tokyo (JP); Shuntaro Aratani, Machida (JP); Kazuna Maruyama, Fuchu (JP); Satoshi Hanamitsu, Kawasaki (JP); Satoshi Ukawa, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

(21) Appl. No.: 12/414,223

(22) Filed: Mar. 30, 2009

(65) Prior Publication Data

US 2009/0249411 A1 Oct. 1, 2009

(30) Foreign Application Priority Data

Apr. 1, 2008 (JP) ................................. 2008-094617

(51) Int. Cl.
*H04N 7/173* (2011.01)

(52) U.S. Cl. ............ 725/88; 725/89; 386/200; 386/291; 386/292

(58) Field of Classification Search ............ 725/88, 725/89; 386/200, 291, 292
See application file for complete search history.

(56) References Cited

U.S. PATENT DOCUMENTS

| 7,316,026 | B2 * | 1/2008 | Ohno et al. | ...................... 725/58 |
| 7,818,764 | B2 * | 10/2010 | Matz | ................................ 725/34 |
| 2007/0092204 | A1 * | 4/2007 | Wagner et al. | ................... 386/83 |

FOREIGN PATENT DOCUMENTS

| EP | 0 929 197 A2 | 7/1999 |
| GB | 2 377 578 A | 1/2003 |
| JP | 2005-136974 | 5/2005 |
| WO | 2004/047432 A1 | 6/2004 |
| WO | 2005/002214 A1 | 1/2005 |

OTHER PUBLICATIONS

The above references were cited in a European Search Report issued on Apr. 28, 2011, of which is enclosed, that issued in the corresponding European Patent Application No. 09156988.9.

* cited by examiner

*Primary Examiner* — Brian Pendleton
*Assistant Examiner* — Nnenna Ekpo
(74) *Attorney, Agent, or Firm* — Cowan, Liebowitz & Latman, P.C.

(57) ABSTRACT

In the case where the receiving apparatus 1 obtains, from a content archive, and reproduces a first video content having the same content as a program being broadcast, the difference of the ending time between the first video content being played and the program being broadcast is detected (S701). In the case where there is a difference in the ending time (YES in step S702), the receiving apparatus 1 obtains, from the content archive, a second video content having the same content as the next program started following the program being broadcast (S703, S704), and reproduces the second video content following the first video content being played (S705 to S709).

16 Claims, 24 Drawing Sheets

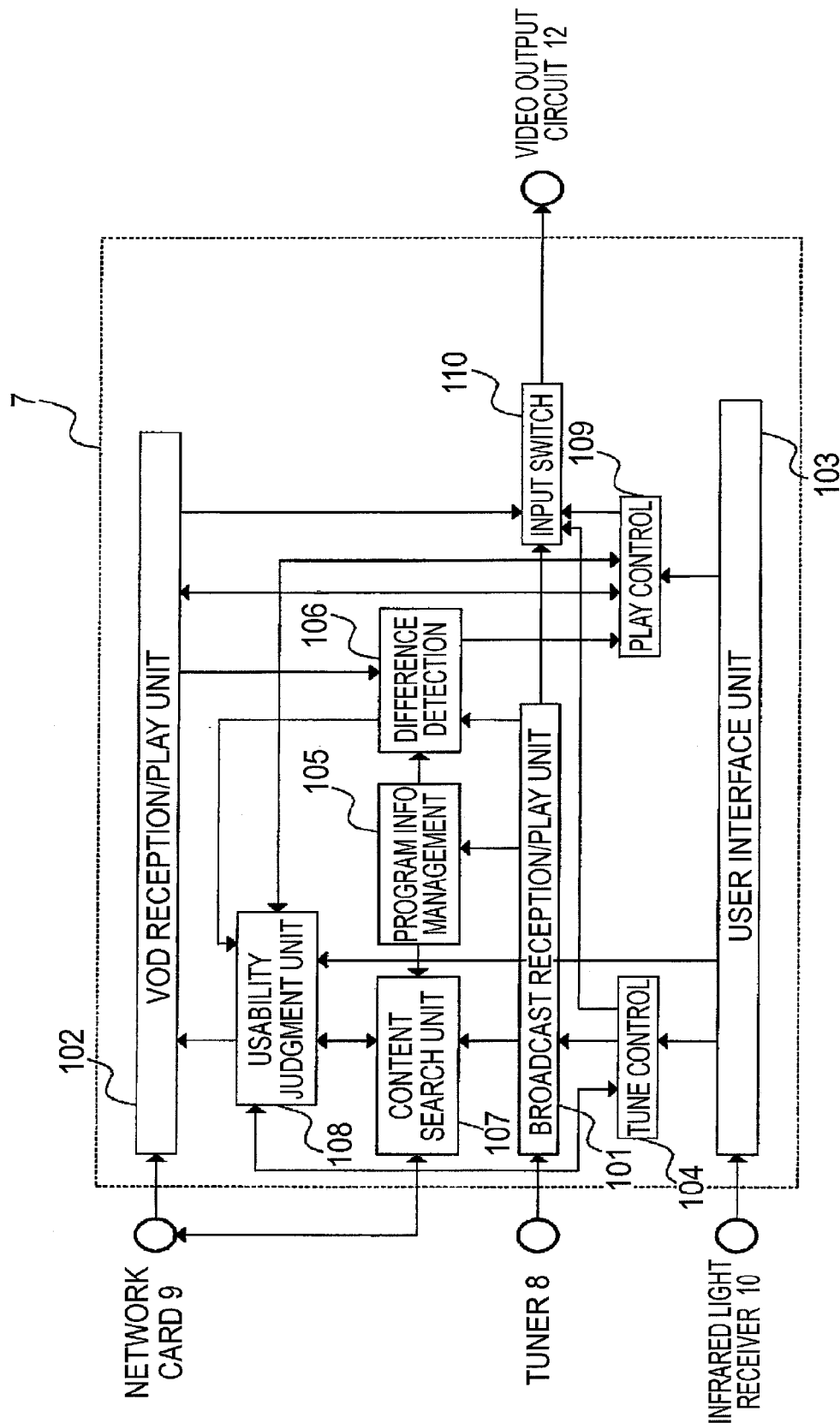

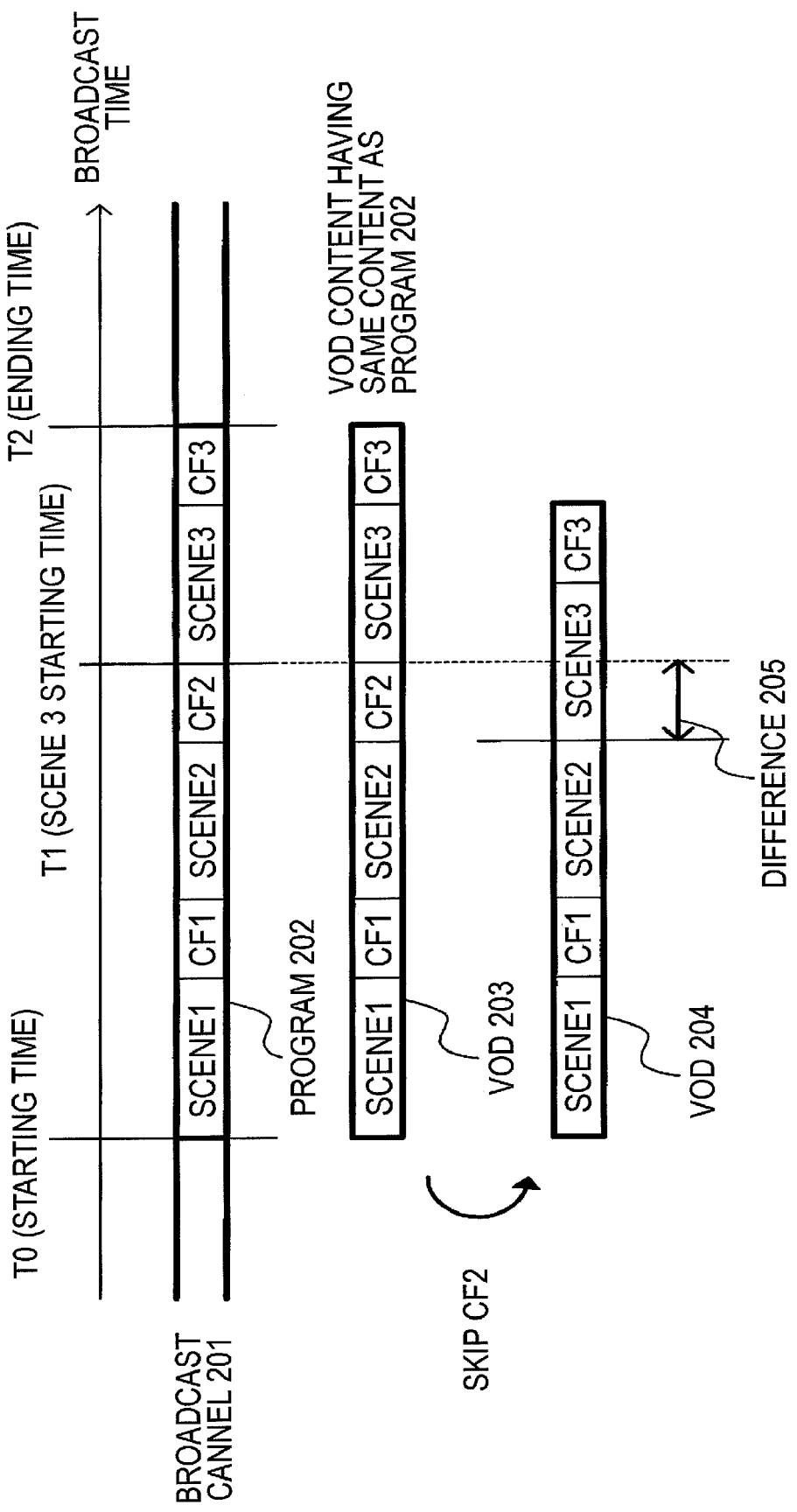

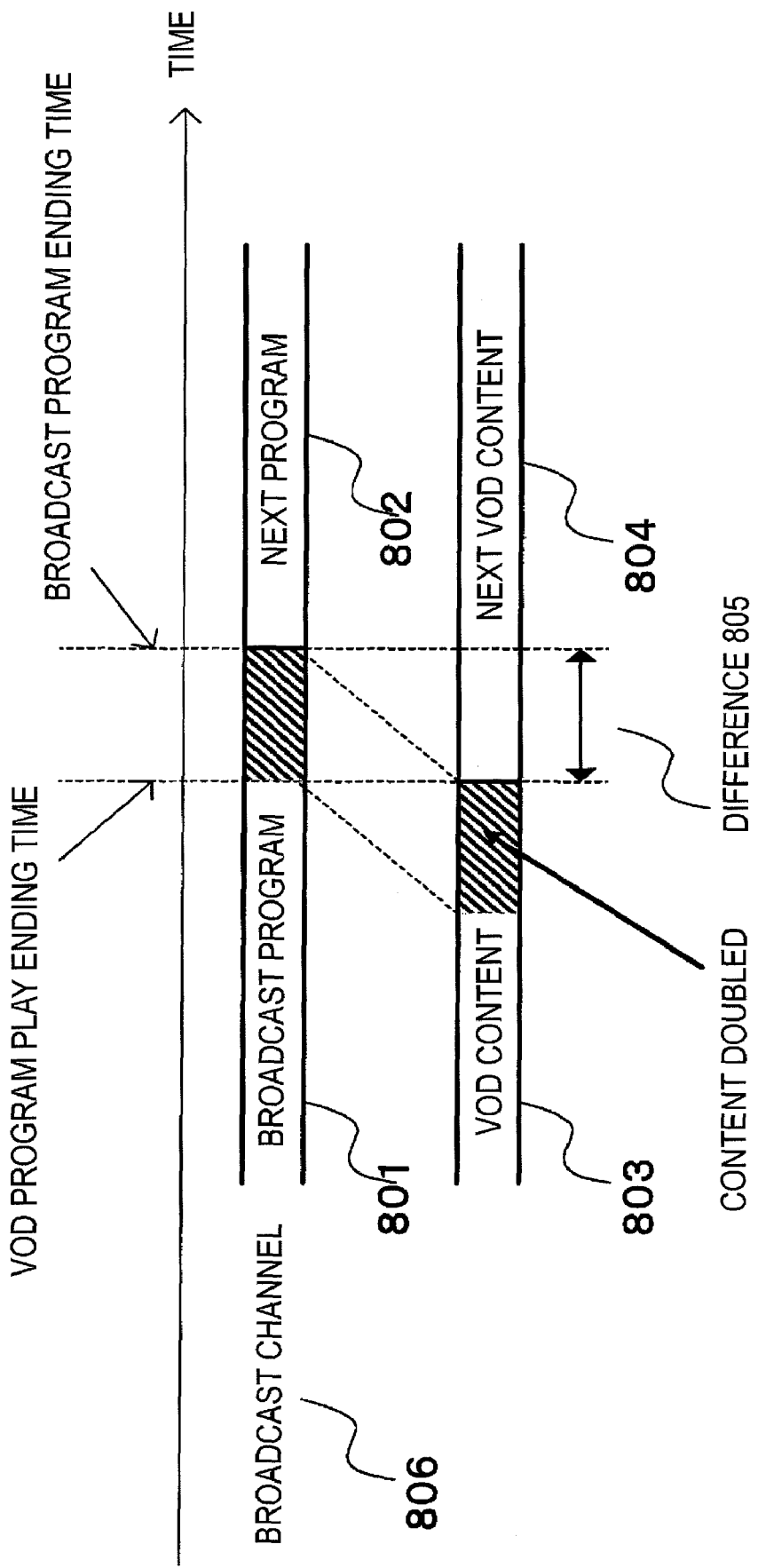

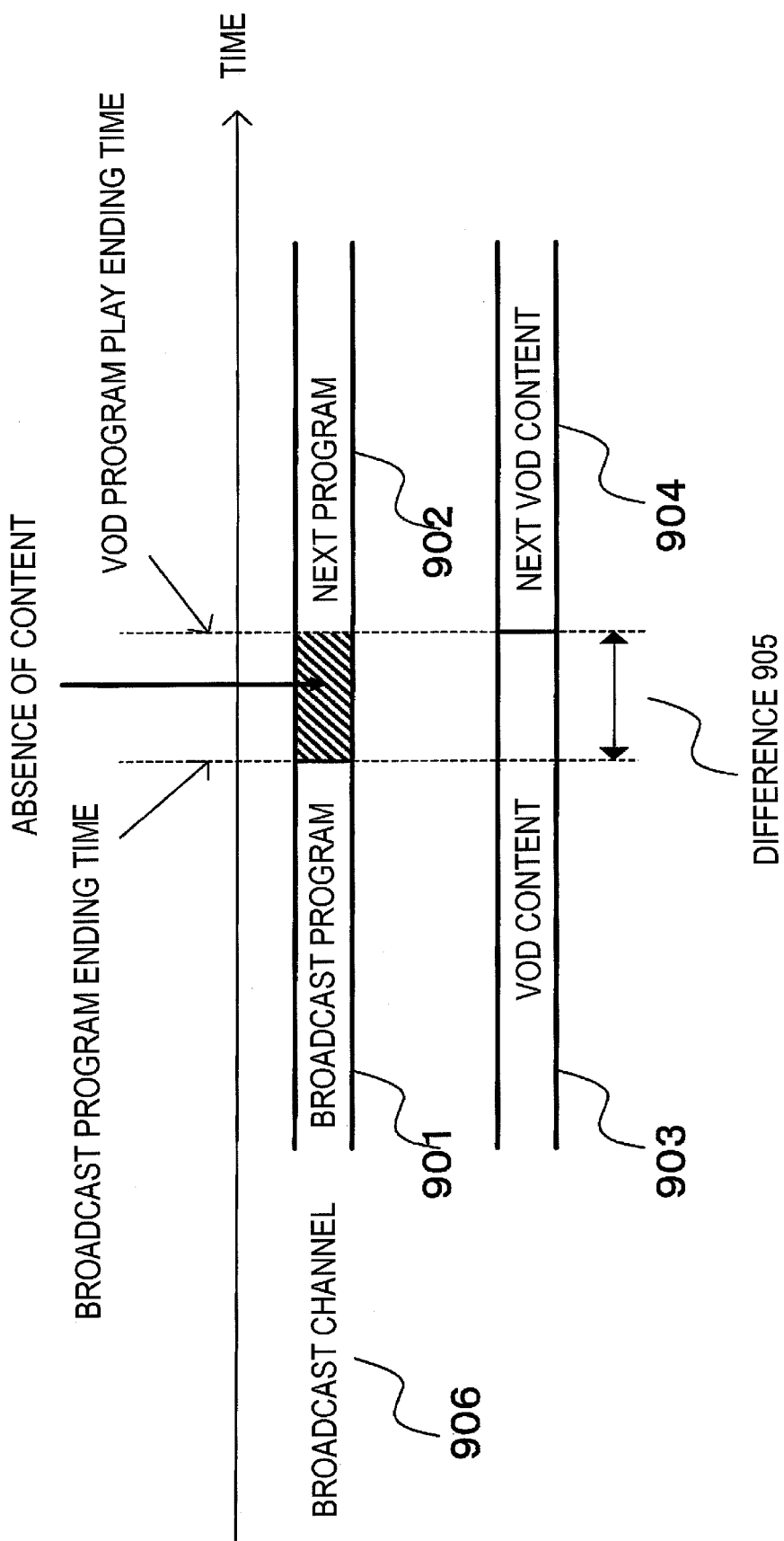

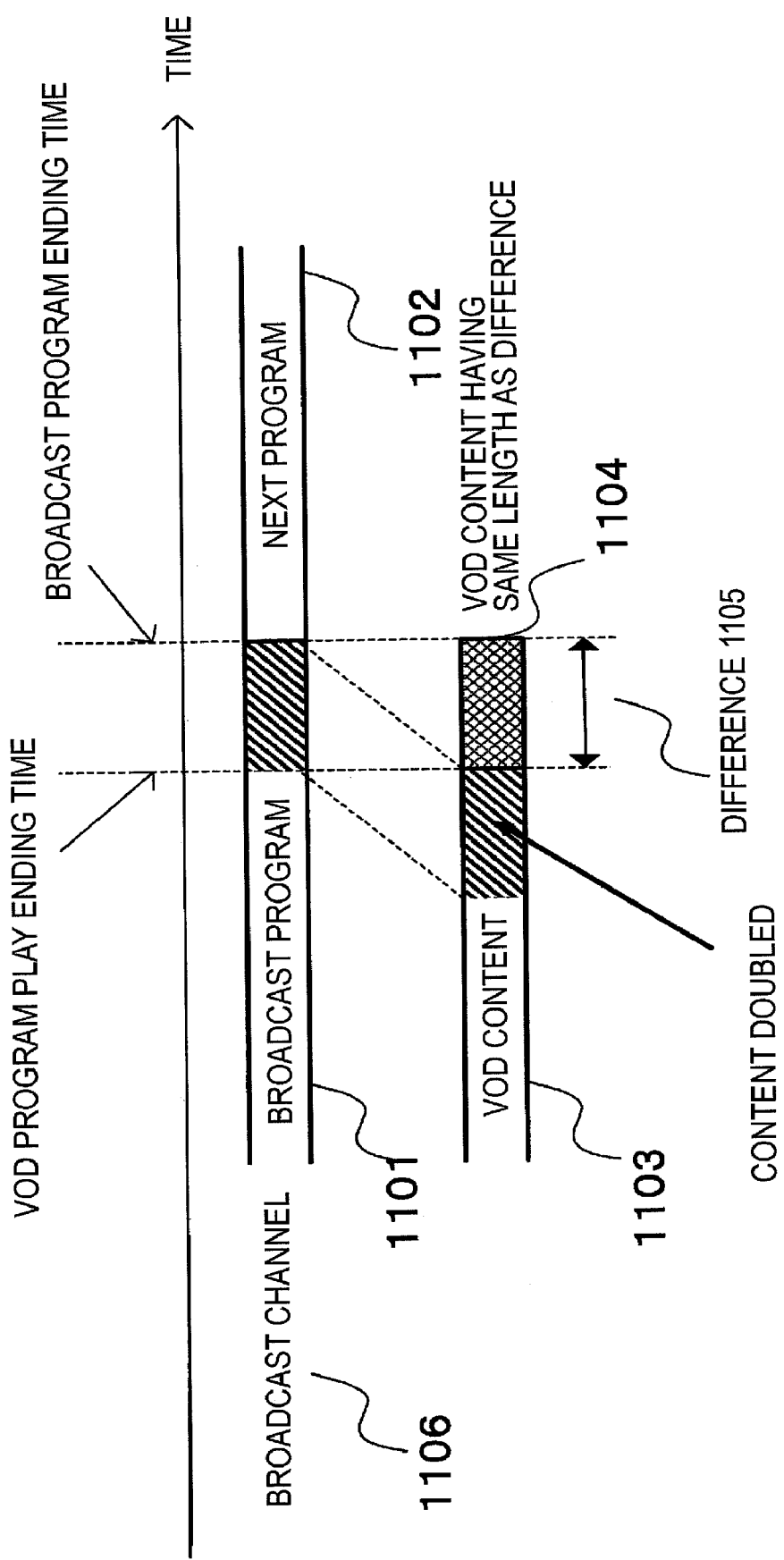

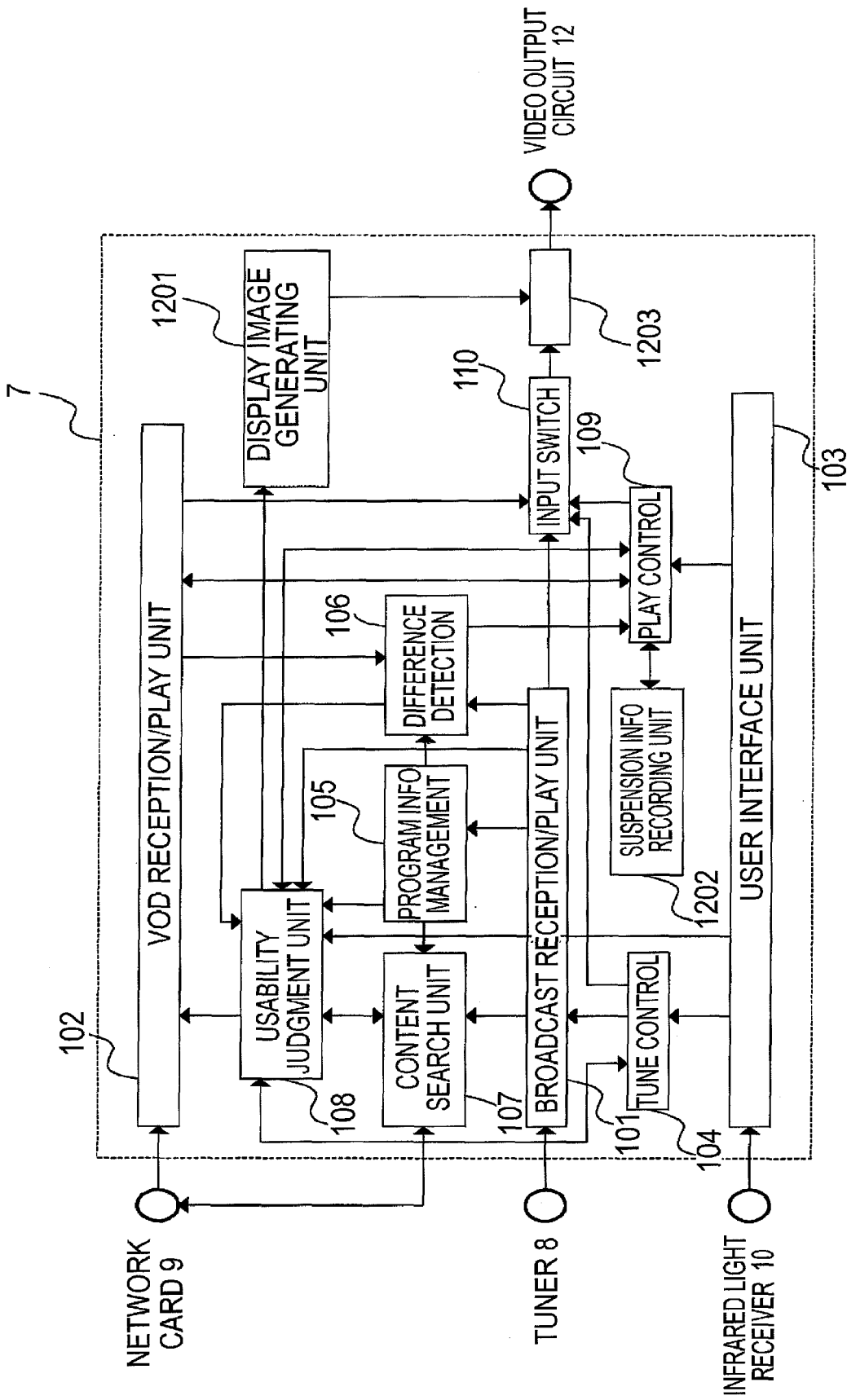

RECEIVING APPARATUS AND CONTROL METHOD THEREOF

BACKGROUND OF THE INVENTION

1. Field of the Invention

This invention relates to a content receiving apparatus and a control method thereof.

2. Description of the Related Art

The video on demand (VOD) permitting the user to view the desired video content at the desired time is extending. In the VOD system, contents such as movies and dramas broadcast on TV in the past are distributed.

With the further extension of VOD in the future, the VOD content is expected to come to be distributed simultaneously with the broadcast program. Then, the user, who begins to view and becomes interested in a broadcast program midway, will switch the viewing to the VOD content and thus can view the particular broadcast program from the very beginning. Also, the user viewing a broadcast program and desirous of performing the operation such as "rapid feed" or "skip" can view the images of the unbroadcast part of the broadcast program by switching to the VOD content. In other words, the user may be able to freely manipulate and view the real-time broadcast program in the same way as a recorded program.

Japanese Patent Application Laid-Open No. 2005-136974 discloses a method of switching the viewing from a broadcast program to a VOD content. In this conventional method, the same VOD content as a program being broadcast is obtained from an archive and rewound to an unrecorded part or rapidly fed to an unbroadcast part.

SUMMARY OF THE INVENTION

The VOD content and the broadcast program have not always exactly the same time length. By deleting a commercial message (CM), for example, the VOD content may be shorter than the corresponding broadcast program in time length. Conversely, the VOD content added to which the scene deleted in the broadcast program may have a longer time than the broadcast program. Also, in spite of the same time length, the operation for rapid feed or rewind on the part of the viewer may end the viewing time of the VOD content earlier or later than the broadcast program.

In the case where the VOD content viewing end time is different from the broadcast program end time, assume that the viewer switches to the broadcasting after viewing the VOD content. The viewer experiences the inconveniences described below. Specifically, in the case where the VOD content viewing end time is earlier than the broadcast program end time, the viewer switching to the broadcast program after the end of the VOD content may be required against his/her will to view the scene already viewed on VOD. In the case where the VOD content viewing end time is later than the broadcast program end time, on the other hand, the viewer switching to the broadcast program after the VOD content ends unwillingly begins to view the next program midway following the program that has been viewed on the VOD content. This poses the problem that the leading part of the next program is missed.

The technique disclosed in Japanese Patent Application Laid-Open No. 2005-136974 fails to employ any measure against this problem, and therefore, the viewer may experience various inconveniences when switching to the broadcast program at the end of viewing the VOD content.

In view of this situation, the object of this invention is to provide a technique for alleviating the inconveniences experienced by the viewer after viewing the same VOD content as the broadcast program even in the case where the broadcast program and the VOD content proceed at different rates.

According to a first aspect of the invention, there is provided a receiving apparatus including:

a broadcast receiving unit which receives and reproduces a broadcast program;

a content obtaining unit which obtains a video content from a content archive;

a play unit which reproduces the video content obtained by the content obtaining unit;

a difference detection unit which detects difference of ending time between a first video content being played and a first broadcast program being broadcast in the case where the first video content having the same content as the first broadcast program is obtained by the content obtaining unit and is being reproduced by the play unit; and a control unit which, in the case where the ending time is different between the first video content and the first broadcast program, controls the content obtaining unit in such a manner as to obtain from the content archive a second video content having the same content as a second broadcast program to be broadcast following the first broadcast program and controls the play unit in such a manner as to reproduce the second video content following the first video content being played.

According to a second aspect of the invention, there is provided a control method of a receiving apparatus including a broadcast receiving unit which receives and reproduces a broadcast program, a content obtaining unit which obtains a video content from a content archive and a play unit which reproduces the video content, the control method including:

a detection step of detecting difference of ending time between a first video content being played and a first broadcast program being broadcast in the case where the first video content having the same content as the first broadcast program is obtained from the content archive and is being reproduced;

a obtaining control step of controlling the content obtaining unit in such a manner as to obtain, from the content archive, a second video content having the same content as a second broadcast program to be broadcast following the first broadcast program, in the case where the ending time is different between the first video content and the first broadcast program; and a play control step of controlling the play unit in such a manner as to reproduce the second video content following the first video content being played.

According to a third aspect of the invention, there is provided a receiving apparatus including:

a broadcast receiving unit which receives and reproduces a broadcast program;

a content obtaining unit which obtains a video content from a content archive;

a play unit which reproduces the video content obtained by the content obtaining unit;

a difference detection unit which detects difference of ending time between a first video content being played and a first broadcast program being broadcast in the case where the first video content having the same content as the first broadcast program is obtained by the content obtaining unit and is being reproduced by the play unit; and a control unit which controls the content obtaining unit in such a manner as to obtain from the content archive another video content and controls the play unit in such a manner as to reproduce the another video content during the period from the end of the first video content being played to the start of a second broadcast program to be broadcast following the first broadcast program, in the case where the first video content being played ends earlier than the first broadcast program being broadcast.

According to a fourth aspect of the invention, there is provided a control method of a receiving apparatus including a broadcast receiving unit which receives and reproduces a broadcast program, a content obtaining unit which obtains a video content from a content archive and a play unit which reproduces the video content, the control method including:

a detection step of detecting difference of ending time between a first video content being played and a first broadcast program being broadcast in the case where the first video content having the same content as the first broadcast program is obtained from the content archive and is being reproduced;

a obtaining control step of controlling the content obtaining unit in such a manner as to obtain another video content from the content archive in the case where the first video content being played ends earlier than the first broadcast program being broadcast; and a play control step of controlling the play unit in such a manner as to reproduce the another video content during the period from the end of the first video content being played to the start of a second broadcast program to be broadcast following the first broadcast program.

According to this invention, even in the case where there is a difference in progress between a current program being broadcast and a video content of the same content as the current program and being viewed on VOD, the inconvenience suffered by the viewer at the end of viewing the VOD content can be reduced.

Further features of the present invention will become apparent from the following description of exemplary embodiments with reference to the attached drawings.

BRIEF DESCRIPTION OF THE DRAWINGS

FIG. 1 is a function block diagram showing a receiving apparatus for realizing first and second embodiments of the invention;

FIG. 2 is a diagram showing a difference between the progress of a broadcast program and the play position of a VOD content having the same content as the broadcast program;

FIG. 8 is a diagram for explaining the state after the VOD content play in the case where the VOD content play position is ahead of the broadcast program play position according to the first embodiment;

FIG. 9 is a diagram for explaining the state after the VOD content play in the case where the VOD content play position is behind the broadcast program play position according to the first embodiment;

FIG. 11 is a diagram for explaining the state after the VOD content play in the case where the VOD content play position is ahead of the broadcast program play position according to the second embodiment;

FIG. 12 is a function block diagram showing a receiving apparatus to realize a third embodiment of the invention;

DESCRIPTION OF THE EMBODIMENTS

<General Description of Embodiments>

Figure 3A:
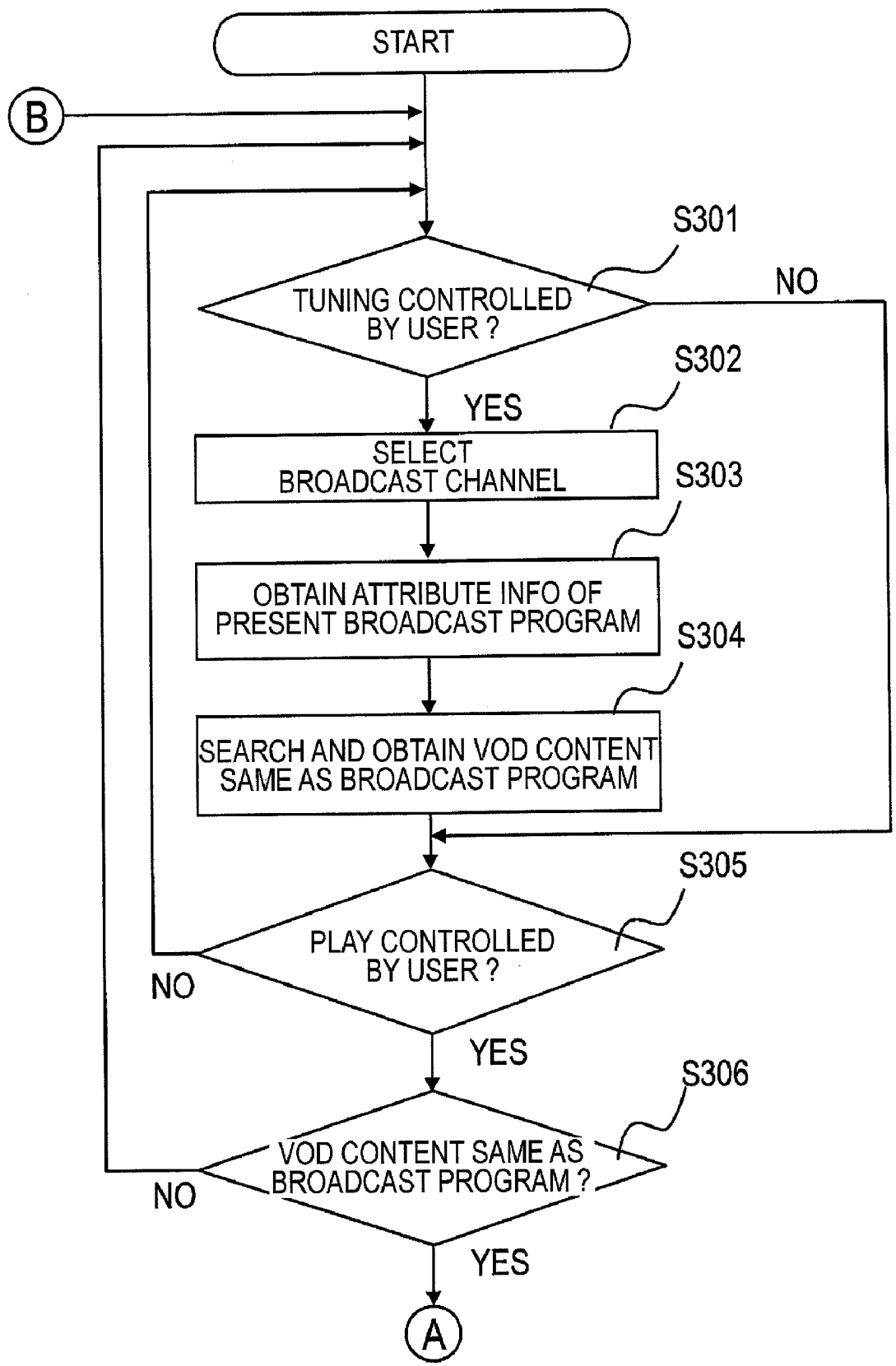
FIG. 3 is a flowchart showing an example of the steps of the process for transferring the viewing from the broadcast program to the VOD content in accordance with the play control request of the user.

The receiving apparatus according to the embodiments of the invention includes a broadcast receiving unit (for example, a broadcast reception/play unit 101 shown in FIG. 1) which receives and reproduces a broadcast program. Also, the receiving apparatus includes a content obtaining unit which obtains a video content from a content archive and a play unit which reproduces the video content (for example, a VOD reception/play unit 102 shown in FIG. 1). The broadcast program is defined as a video program distributed through the terrestrial broadcasting, the satellite broadcasting, the cable broadcasting or the IP broadcasting which can be viewed only in real time (i.e. of which the play position or the play speed cannot be changed). The video content obtained from the content archive, on the other hand, includes a VOD content provided by a VOD server, a movie content that can be downloaded from a movie site and a recorded content obtained by recording a broadcast program.

The receiving apparatus has the function of reproducing, in addition to the broadcast program being broadcast, the video content obtained from the content archive and having the same content as the broadcast program. The "video content having the same content" is not necessarily identical in content exactly but may be an image having a somewhat different image quality such as the resolution, compression ratio or tone. In other words, "the same content" is defined as the content of an image substantially identical as viewed from the user.

In the case where the broadcast program being broadcast and the video content being played are different in time length or in the case where the play position or the play speed of the video content being played is changed, the difference in the ending time may occur between the video content being played and the broadcast program being broadcast. In such a case, the simple switching to the broadcast program at the end of the playing the video content would undesirably display an image already viewed or miss the start of the next program.

Accordingly, the receiving apparatus includes a difference detection unit (for example, the difference detection unit 106 shown in FIG. 1) which detects the difference of the ending time between the video content (first video content) being played and the broadcast program (first broadcast program) being broadcast, and a control unit which controls the various operations based on the result of detection by the difference detection unit (as in the embodiment described later, "a control unit" is configured by collaboration between a content search unit 107, a usability judgment unit 108 and a play control unit 109). In the case where a difference occurs in the ending time, the control unit controls the content obtaining unit (obtaining control operation) to obtain, from the content archive, a second video content having the same content as the next broadcast program (second broadcast program) to be broadcast following the program being broadcast. Then, the control unit controls the play unit (play control operation) to reproduce the second video content having the same content as the next broadcast program immediately following the first video content being played (refer to the first to third embodiments). As a result, the image is properly switched and the inconveniences described above are obviated. In the case where there is no difference in ending time, on the other hand, the control unit may control the broadcast receiving unit to reproduce the next broadcast program following the first video content being played.

In the case where the second video content having the same content as the next broadcast program cannot be obtained from the content archive, the play control operation can be performed as described below.

(1) In the case where the first video content being played ends earlier than the program being broadcast, still another video content (third video content) is obtained from the content archive and played during the period from the end of the first video content to the start of the next broadcast program (refer to the second embodiment). The "another video content" may include a CF (commercial film), a short-time information program or a given one corner (scene) of a VOD content. As a result, the vacant time from the end of play of the first video content to the start of the next program can be filled to obviate the viewing inconvenience. The "another video content" obtained from the content archive preferably has the same time length as the difference of the ending time between the first video content and the current program being broadcast. As a result, the sense of incongruence is eliminated in the switching operation from the first video content to the "another" video content to the next broadcast program.

(2) In the case where the first video content ends later than the program being broadcast, on the other hand, the play (reproduction) of the first video content is suspended and switched to the play of the next broadcast program at the starting time of the next broadcast program (refer to the third embodiment). This is by reason of the fact that although the first video content can be reviewed later, the next broadcast program (the video content having the same content cannot be obtained) cannot be reviewed, and therefore, the play of the next broadcast program is given priority. In this way, the inconvenience of the user can be minimized. In view of the fact that which is more important to the user is not clear, the continued play of the first video content or the switching to the next broadcast program, however, it is preferable to ask the user to select whether the first video content is to be switched to the next broadcast program or not. Further, the apparatus may include a recording unit (for example, a suspended information recording unit 1202 shown in FIG. 12) which records, in a storage unit (memory), the suspension information required for restarting the play of the first video content from the suspension point where the play of the first video content is suspended. As a result, the viewing of the first video content can be restarted easily.

In the configuration described above, the second video content, if capable to be obtained, having the same content as the next broadcast program is played. If it is preferable to give priority to the play of the broadcast program over the play video content (in order to reduce the communication load or the cost, etc.), however, the play control operation described below may be carried out. Specifically, in the case where the first video content being played ends earlier than the broadcast program being broadcast (regardless of the presence or absence of the video content of the same content), another video content is obtained from the content archive and played during the vacant time. As a result, the vacant time from the end of play of the first video content to the start of the next broadcast program can be filled to obviate the viewing inconvenience.

With reference to the drawings, preferred embodiments of the invention are described in detail illustratively. First, with reference to FIGS. 18 and 19, the general configuration of a video display system and the internal configuration of the receiving apparatus are described. After that, the first to third embodiments are specifically described.

(General Configuration)

Figure 18:
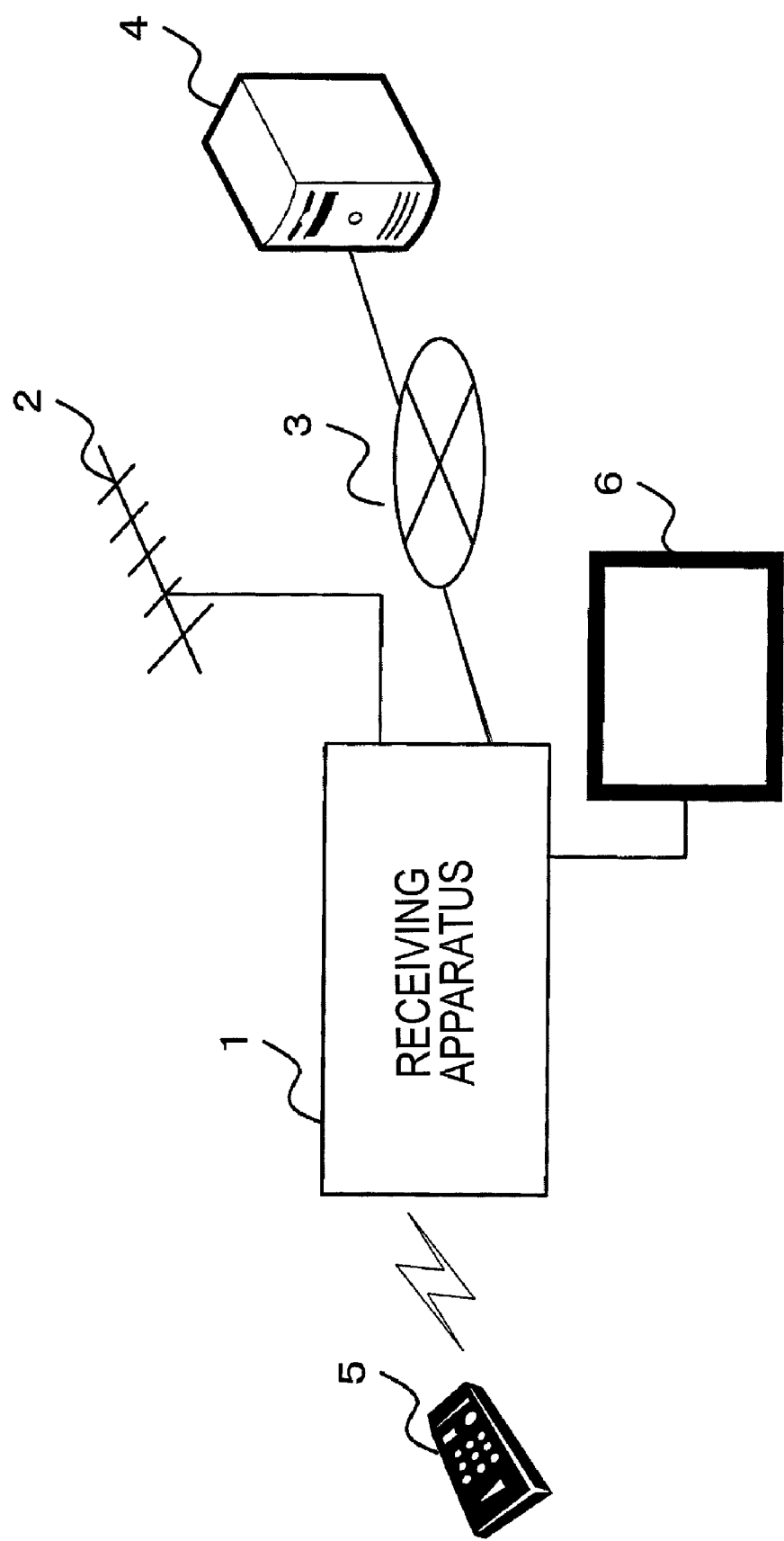
FIG. 18 is a diagram showing the connection between the receiving apparatus and peripheral devices.

FIG. 18 shows the general configuration of the video display system according to an embodiment of the invention. This video display system is configured of a receiving apparatus 1 and a monitor 6.

The receiving apparatus 1 can receive the broadcast wave from a broadcasting station (not shown) through an antenna 2 on the one hand and a VOD content from a VOD server 4 (content archive) through a network 3 on the other hand. Also, the receiving apparatus 1 selects the channel, plays the VOD content or displays a menu screen in response to the operation information received from a remote controller 5.

(Receiving Apparatus)

Figure 19:
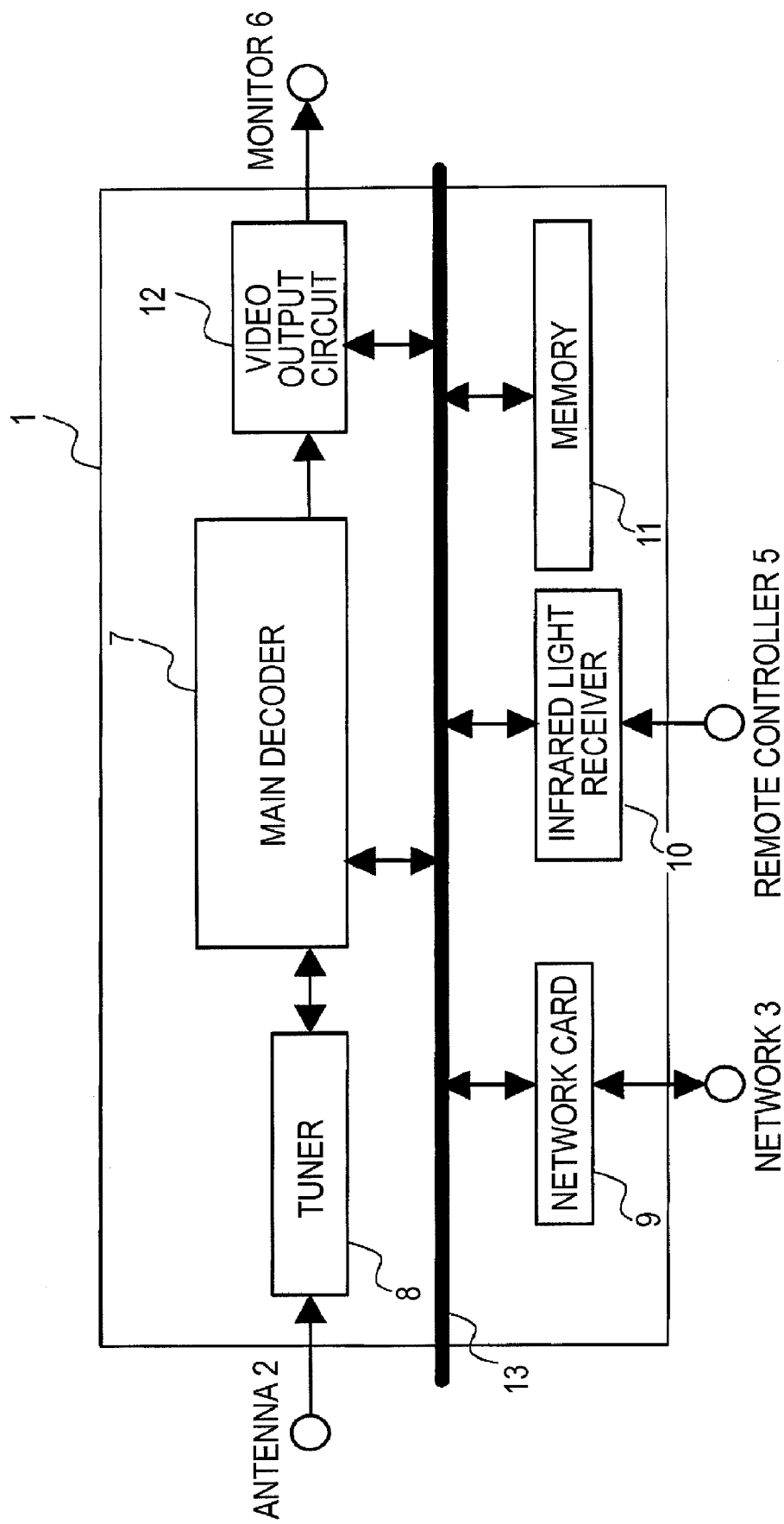
FIG. 19 is a diagram for explaining each internal component block of the receiving apparatus.

FIG. 19 is a block diagram showing the internal configuration of the receiving apparatus 1 shown in FIG. 18.

A main decoder 7 receives the audio/video data from a tuner 8 and a network card 9, and outputs the video signal to a video output circuit 12 and an audio signal to an audio output circuit (not shown). The main decoder 7 analyzes and separates the audio/video data received, and decodes the coded data. Also, the main decoder 7 performs such a control operation as to change the play method in accordance with the internal state of the receiving apparatus 1 or the state of the signal input from an external source. The signal input from an external source is a user command input through a remote controller 5.

The tuner 8 executes the process of receiving the broadcast wave and retrieving the broadcast signal. The tuner 8, upon reception of a command from the main decoder 7 to tune to a specified frequency, selects the channel of the particular frequency, extracts the broadcast signal contained in the particular frequency and transfers it to the main decoder 7. In an ordinary digital TV, the tuner 8 is a terrestrial digital broadcast tuner or a BS/broadband CS digital broadcast tuner.

The network card 9 is a block constituting an interface with the network 3. The VOD content is transmitted to the main decoder 7 through the network card 9.

An infrared light receiving unit 10 receives an infrared light signal transmitted from the remote controller 5 and transmits the received signal to the main decoder 7. Incidentally, the invention is not limited to this embodiment in which the signal is received by infrared light from the remote controller 5.

The memory 11 temporarily stores the data generated by the main decoder 7 and other component circuits. A specific example of the memory 11 is a SRAM (Static Random Access Memory), a DRAM (Dynamic Random Access Memory), a flash memory or an EEPROM (Electronically Erasable Programmable Read-Only Memory).

The video output circuit 12 receives the video signal output from the main decoder 7 and outputs by converting the signal into a format suitable for the monitor 6. The video output circuit 12 also executes the process of controlling the video signal output and outputs the video signal to the monitor 6 in accordance with an output frame rate.

The internal bus 13 is used to transmit/receive the data between the component blocks in the receiving apparatus 1.

<First Embodiment>
(Main Decoder)

FIG. 1 is a block diagram showing the internal functions of the main decoder 7 of the receiving apparatus 1 according to the first embodiment of the invention. Each function block is described below with reference to FIG. 1.

A broadcast reception/play unit 101 receives the multiplexed broadcast program data from the broadcast wave input through the antenna 2 and separates the signal into the video and audio data. The broadcast reception/play unit 101 decodes the video and audio signals and outputs the signals to the video output circuit 12 shown in FIG. 19 and the speaker (not shown) through an input switching unit 110 thereby to convert the data into the program attribute information. The video and audio signals making up the broadcast program data are multiplexed using the MPEG2 (Moving Picture Experts Group 2; the second standard of the color moving picture coding scheme standardization group) transport stream (TS). The video and audio signals separated by the broadcast reception/play unit 101, which are coded by the MPEG2 Video and the MPEG2 Audio schemes, are decoded also by the broadcast reception/play unit 101 into the video and the audio data, respectively. The program attribute information includes the program broadcast channels and the program titles used in the electronic program guide or the program recommendation. The program attribute information is transmitted to and managed by a program information management unit 105. The broadcast reception/play unit 101 also has the function of managing the present time based on the present time point and the present date contained in the program attribute information.

The VOD reception/play unit 102 receives, from the VOD server 4 on the network 3 shown in FIG. 18, the VOD content data of which the location is designated, and reproduces the content in accordance with the play control command from the play control unit 109. The "location" described above is defined as a URI (Uniform Resource Identifier) assigned to the information resources on the network 3. The "play control command" includes the play control command designating the absolute position as in the reproduction from the head of the content or the reproduction of a scene, the play control command designating the relative positions such as the play by skipping 15 seconds ahead or the control command to change the play speed such as the rapid feed play or the pause.

The user interface unit 103 has the function to receive various commands from the user and notify the user commands to the tuning control unit 104 and the play control unit 109 to perform the operation in response to the commands. The command from the user includes the "tuning command" for selecting the broadcast channel or the play control command described above which are normally issued from the remote controller 5 shown in FIG. 18.

The tuning control unit 104 instructs the broadcast reception/play unit 101 to select the channel in accordance with the tuning command received from the user interface unit 103. The tuning request is issued by the depression of a specified button on the remote controller 5 or the tuning operation on the electronic program guide.

The program information management unit 105 holds the program attribute information of the programs being broadcast or scheduled to be broadcast. These program attribute information are periodically updated by the broadcast reception/play unit 101.

The difference detection unit 106 detects a difference based on the "program progress correspondence table" transmitted from the VOD reception/play unit 102, the "program attribute information" transmitted from the program information management unit 105 and the "present time information" transmitted from the broadcast reception/play unit 101. The "difference" is defined as the difference between the play position of the program being broadcast and the play position of the content being played.

The difference described above is shown schematically in FIG. 2. FIG. 2 is a diagram showing a case in which the VOD 203, i.e. the video content having the same content as the program 202 is played during the time zone in which the program 202 started at time point T0 is being broadcast in the broadcast channel 201. The VOD 203 is a VOD content on the server, and therefore, the reproduction thereof can be variously controlled. As shown in FIG. 2, for example, the content having the time length cf2 can be skipped. As the result of skipping the time length cf2, the VOD 203 is changed to the VOD content having the length indicated by the VOD 204, with the result that a difference 205 is generated between the time length of the VOD 204 and that of the program 202. This is an example of the "difference" described above. The "program progress correspondence table" is described later.

The content search unit 107 obtains the program attribute information on a designated program from the program information management unit 105 and detects by search whether the program defined by the program attribute information exists as a VOD content in the VOD server 4 on the network 3. The result of the search is transmitted to a usability judgment unit 108 described later, whereby the content location information is transmitted to the VOD reception/play unit 102 from the usability judgment unit 108. A trigger for the content search unit 107 to start the content search is issued by the broadcast reception/play unit 101 or the usability judgment unit 108.

The usability judgment unit 108 judges the usability of a content based on the search result from the content search unit 107 and, upon judgment that it is usable, issues a command to the VOD reception/play unit 102 to obtain the retrieved content.

The play control unit 109 instructs the VOD reception/play unit 102 to control the play operation in accordance with play control request such as the trick play received from the user interface unit 103. The "trick play" is to change the play position such as "skip 15 seconds ahead" or "rapid feed". In the case where the trick play request is received while viewing the broadcast program, the operation is switched to the VOD play.

The input switching unit 110 executes the process by which the image output to the monitor is switched in accordance with the switch command from the play control unit 109 or the usability judgment unit 108.

(Switch From Broadcast Program to VOD Content)

Next, the steps of the process executed at the time of transition to the viewing of the VOD content having the same content while viewing a broadcast program are described with reference to the flowchart of FIG. 3.

Figure 3B:
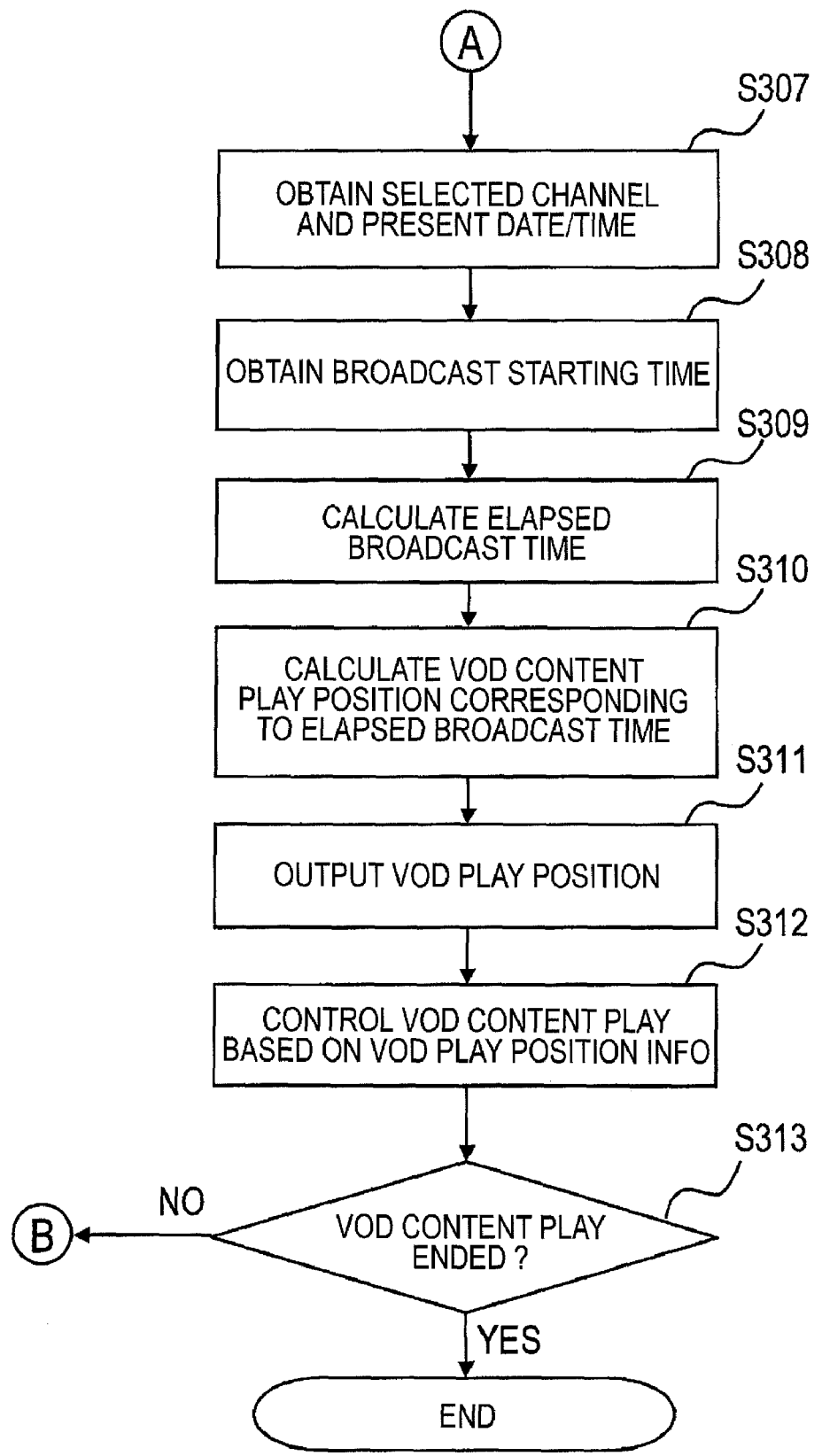

FIG. 3 shows the processing flow for transition from the normal state of viewing the broadcast program to the viewing of the VOD content in response to a user command. The process in this flowchart generates the difference between the broadcast play position and the VOD play position as shown in the example of FIG. 2. Incidentally, the flow shown in FIG. 3 is realized by the collaboration among the function blocks shown in FIG. 1. The control signals between the function blocks are shown by arrows in FIG. 1. Also, which function block executes the processing operation in each step of the flow shown in FIG. 3 is described later with reference to each step.

First, step S301 judges whether the user has issued a tuning control request or not. The tuning control request from the user is issued by the remote controller 5 through the user interface unit 103 shown in FIG. 1. Upon issue of the tuning control request from the user, the process proceeds to step S302, otherwise to step S305.

In the case where a tuning control request is issued, step S302 executes the tuning process for selecting the broadcast channel based on the tuning control request from the user generated in step S301. The process of step S302 is executed by the broadcast reception/play unit 101 through the tuning control unit 104 shown in FIG. 1. The broadcast reception/play unit 101, in order to obtain the designated broadcast channel, controls the tuner 8 shown in FIG. 19, and after thus changing the channel to the desired one, receives the broadcast signal MPEG2 TS. The video and audio signals contained in the MPEG2 TS are decoded in the broadcast reception/play unit 101 and output to the input switching unit 110 shown in FIG. 1.

Next, in step S303, the attribute information about the program being broadcast in the broadcast channel selected by tuning is obtained from the broadcast signal. This obtaining process is executed by the broadcast reception/play unit 101 shown in FIG. 1. And the broadcast attribute information thus obtained is transmitted to and managed by the program information management unit 105 shown in FIG. 1.

Based on the broadcast program attribute information obtained in step S303, the process of retrieving and acquiring from the VOD server the content having the same content as the VOD content being broadcast is executed in step S304. The process in step S304 is executed by the content search unit 107, the usability judgment unit 108 and the VOD reception/play unit 102 shown in FIG. 1. The content search unit 107 executes the process of retrieving the same content from the VOD server. The search command is issued to the content search unit 107 from the broadcast reception/play unit 101. The result of search is transmitted to the usability judgment unit 108 from the content search unit 107. The search result thus transmitted includes the information as to whether the same content exists in the VOD server or not and, if it exists so, the URI information thereof. The usability judgment unit 108, based on the search result obtained from the content search unit 107, issues a VOD obtaining command to the VOD reception/play unit 102. In step S304, the VOD content obtaining command is issued to the VOD reception/play unit 102 as soon as the same VOD content is found in the server.

Step S305 executes the process of judging whether a play control request is issued from the user or not. The play control request from the user is issued by the remote controller 5 through the user interface unit 103 shown in FIG. 1. Upon issuance of the play control request from the user, the process proceeds to step S306, otherwise, to step S301.

Step S306 judges whether the VOD content having the same content as the broadcast program could be obtained in step S304. In the presence of the same VOD content, the play control request of the user can be fulfilled, and therefore, the process proceeds to step S307. Otherwise, the process proceeds to step S301.

The process of steps S307 to S311 represents the procedure for detecting the play position of the VOD content (the difference information between the broadcast play position and the VOD content play position) required for transition from the broadcast play process to the VOD content play process. The process of steps S307 to S311 is executed by the difference detection unit 106 shown in FIG. 1.

Step S307 obtains the information on the channel being selected and the present date/hour from the broadcast reception/play unit 101.

Next, step S308, based on the channel information and the present date/hour obtained in step S307, obtains the broadcast start date/hour of the program being broadcast. The broadcast start date/hour information is stored as a kind of the broadcast program attribute information in the program information management unit 105 shown in FIG. 1.

Step S309, based on the present date/hour obtained in step S307 and the broadcast start date/hour obtained in step S308, calculates the elapsed broadcast time indicating the degree to which the present broadcasting has proceeded. The elapsed broadcast time is calculated by subtracting the program broadcast start date/hour from the present date/hour.

Next, step S310 calculates the VOD content play position based on the elapsed broadcast time calculated in step S309 and the program progress correspondence table. The program progress correspondence table is the information accompanying the VOD content and defined as the data obtained from the VOD reception/play unit 102 shown in FIG. 1.

Figure 4:
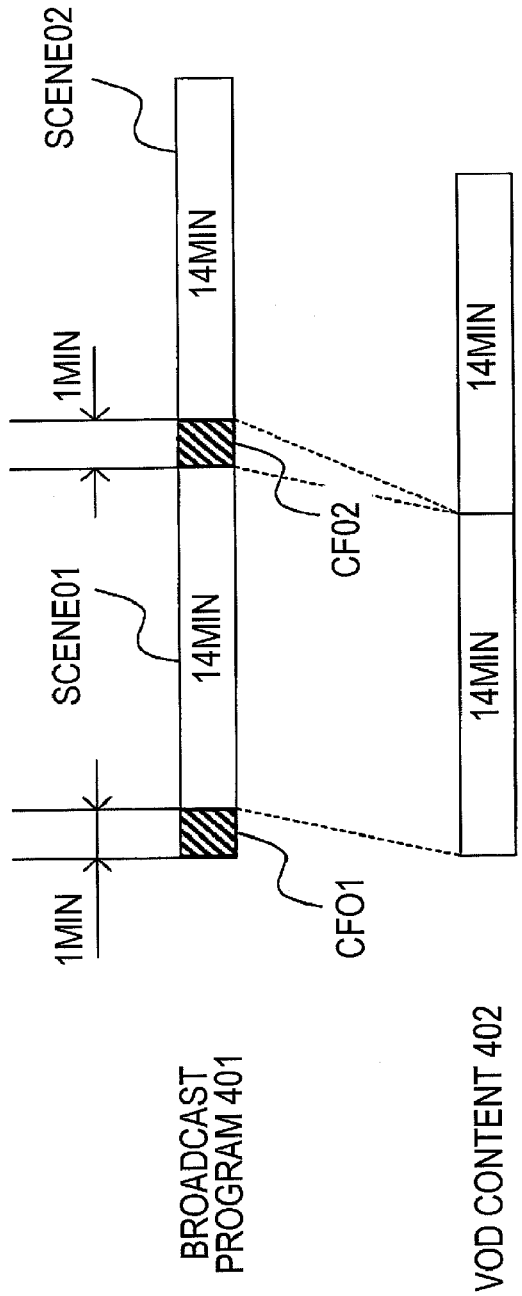
FIG. 4 is a diagram showing an example of a program progress correspondence table relating the broadcast program to the play position of the VOD content having the same content as the broadcast program.

An example of the program progress correspondence table is shown in FIG. 4. FIG. 4 is a diagram showing the program progress correspondence table 403 accompanying the VOD content 402. The program progress correspondence table 403 indicates the VOD content play time in correspondence with the elapsed time of the broadcast program 401 having the same content as the VOD content 402. The VOD content play time can be calculated from the elapsed time of the broadcast program 401. Also, a particular time point at which the present VOD play position is scheduled to be played in the actual broadcasting can be calculated from the VOD content play time.

Figure 5:
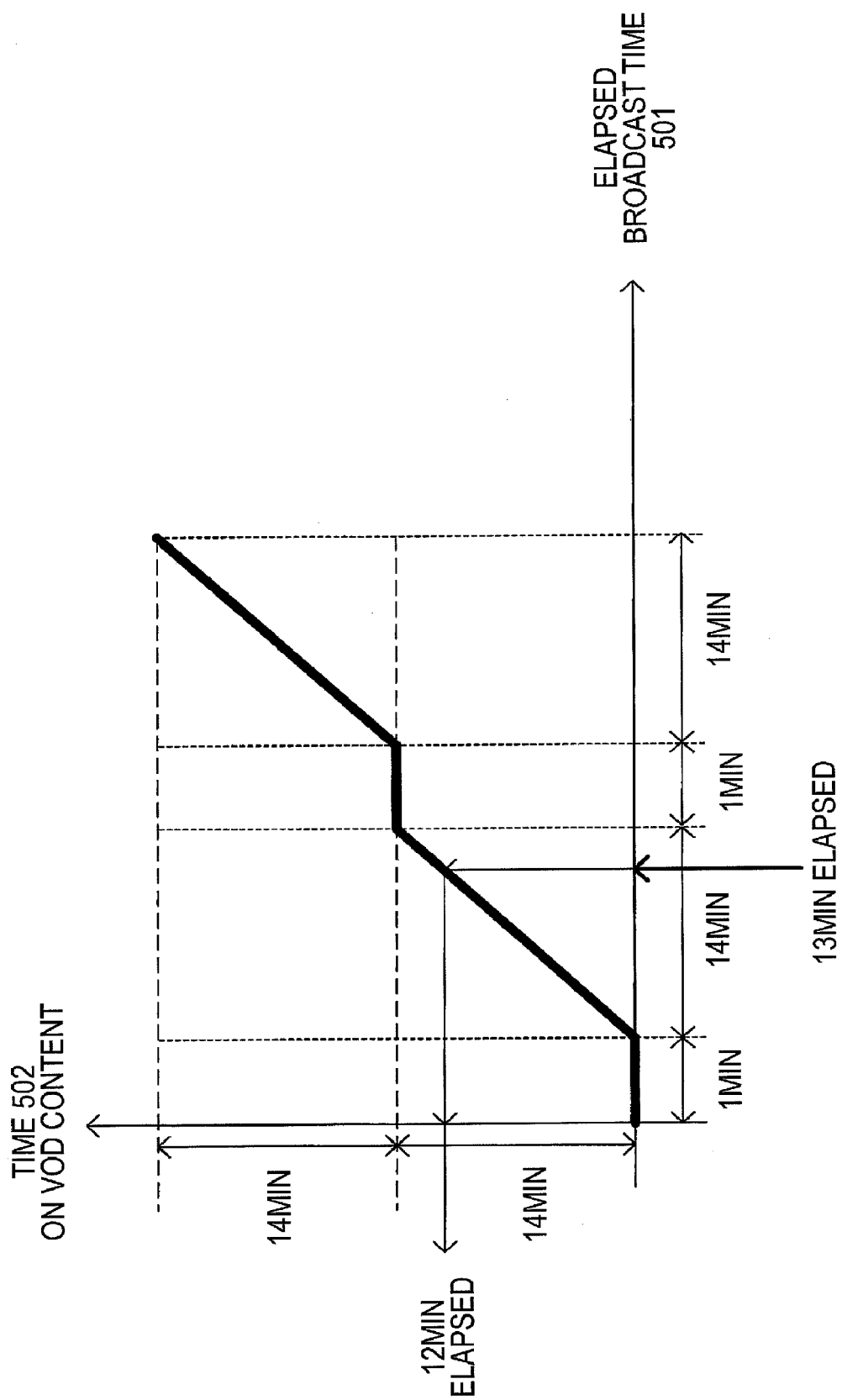
FIG. 5 is a diagram for explaining a method of calculating the VOD content play position from the elapsed time of the broadcast program based on the program progress correspondence table.

The VOD content play position calculation method carried out in step S310 is described with reference to FIG. 5. FIG. 5 is a diagram showing the correspondence between the elapsed broadcast time 501 and the VOD content play time 502 prepared based on the program progress correspondence table shown in FIG. 4. In FIG. 5, assuming that the elapsed broadcast time is 13 minutes, for example, the VOD play position can be calculated as 12 minutes using the graph of FIG. 5.

The VOD play position calculated in step S310 is output to the play control unit 109 of FIG. 1 in step S311.

In step S312, the process of controlling the switching to the VOD content is executed based on the VOD content play position information obtained in step S311. The process of step S312 is executed by the play control unit 109 shown in FIG. 1. The play control unit 109, based on the VOD content play position information obtained from the lag time detection unit 106, determines the VOD play position, and issues a play start command to the VOD reception/play unit 102. At the same time, the play control unit 109 transmits a command to the input switching unit 110 to switch the video output of the broadcast wave to the video output which reproduces the VOD content. In this way, the process of switching from the viewing of the broadcast program to the VOD content play is executed in step S312.

Figure 6:
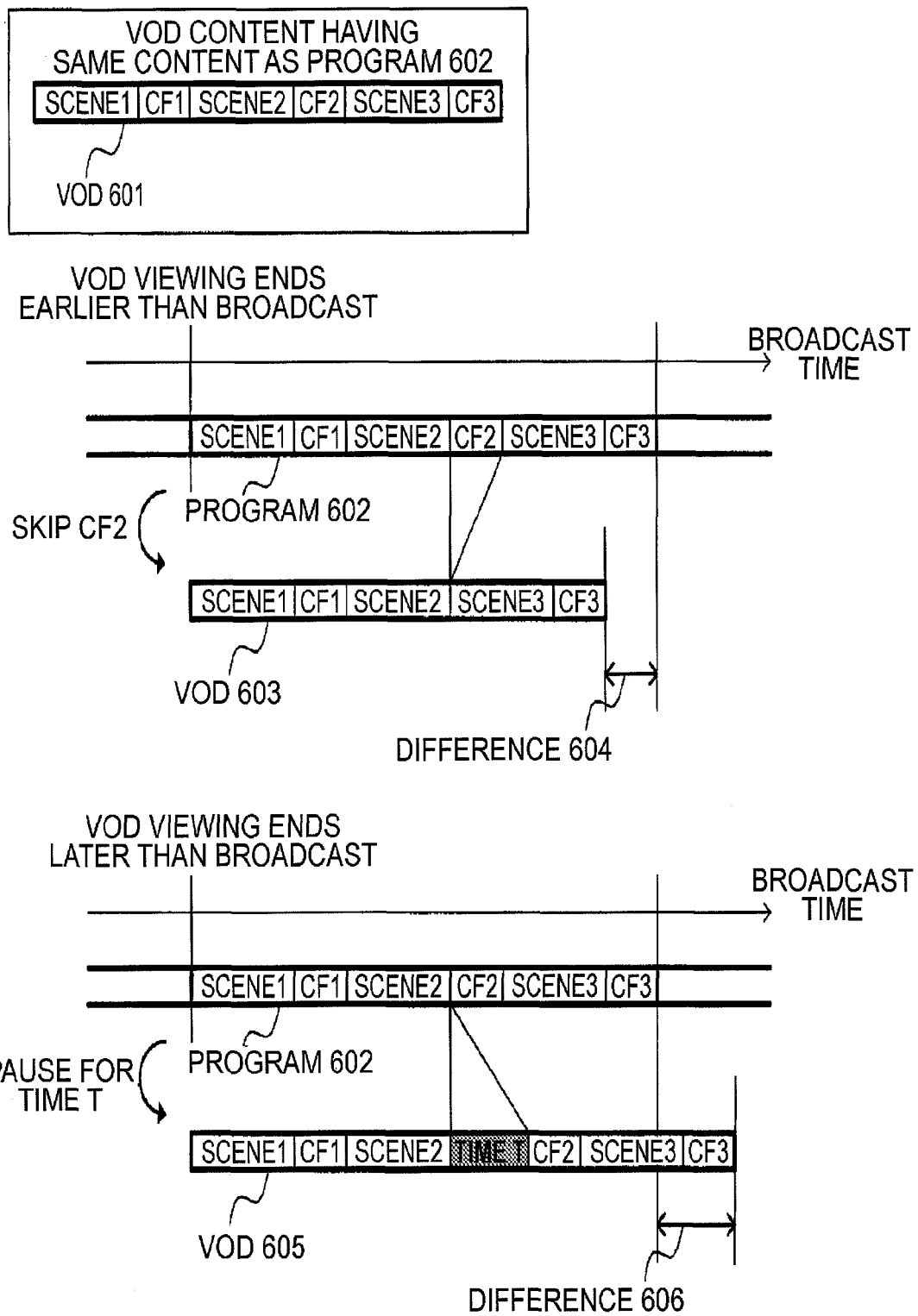
FIG. 6 is a diagram for explaining the difference, i.e. the difference between the broadcast program and the play position of the VOD content at the end of the VOD content.

After the transition described above, the play position of the broadcast program, i.e. the progress position of the program being broadcast is different from the VOD content play position, and a difference develops between them. Depending on the type of the play control request of the user, this difference may represent either the state in which the progress of the broadcast program is delayed behind the VOD content or the state in which the progress of the broadcast program is ahead of the VOD content. This difference is shown in FIG. 6. In FIG. 6, the difference 604 indicates that the skip process executed within the range of the broadcast program 602 ends the reproduction before the broadcast ending time. Also, the lag time 606 in FIG. 6 indicates that the reproduction ends later than the end of the broadcasting due to the pause carried out by the user at a given point within the broadcast program 602. Incidentally, the difference assumes various different values depending on the play control request of the user.

FIG. 3 shows only an example of the method of transition from the state in which the broadcast program is viewed to the reproduction (play) of the VOD content. The present invention, therefore, is not limited to the transition method shown in FIG. 3.

(Reproduction of VOD Content)

Next, the steps of the process executed at the end of the VOD content play in the presence of the difference described above are described with reference to the flowchart of FIG. 7.

Figure 7:
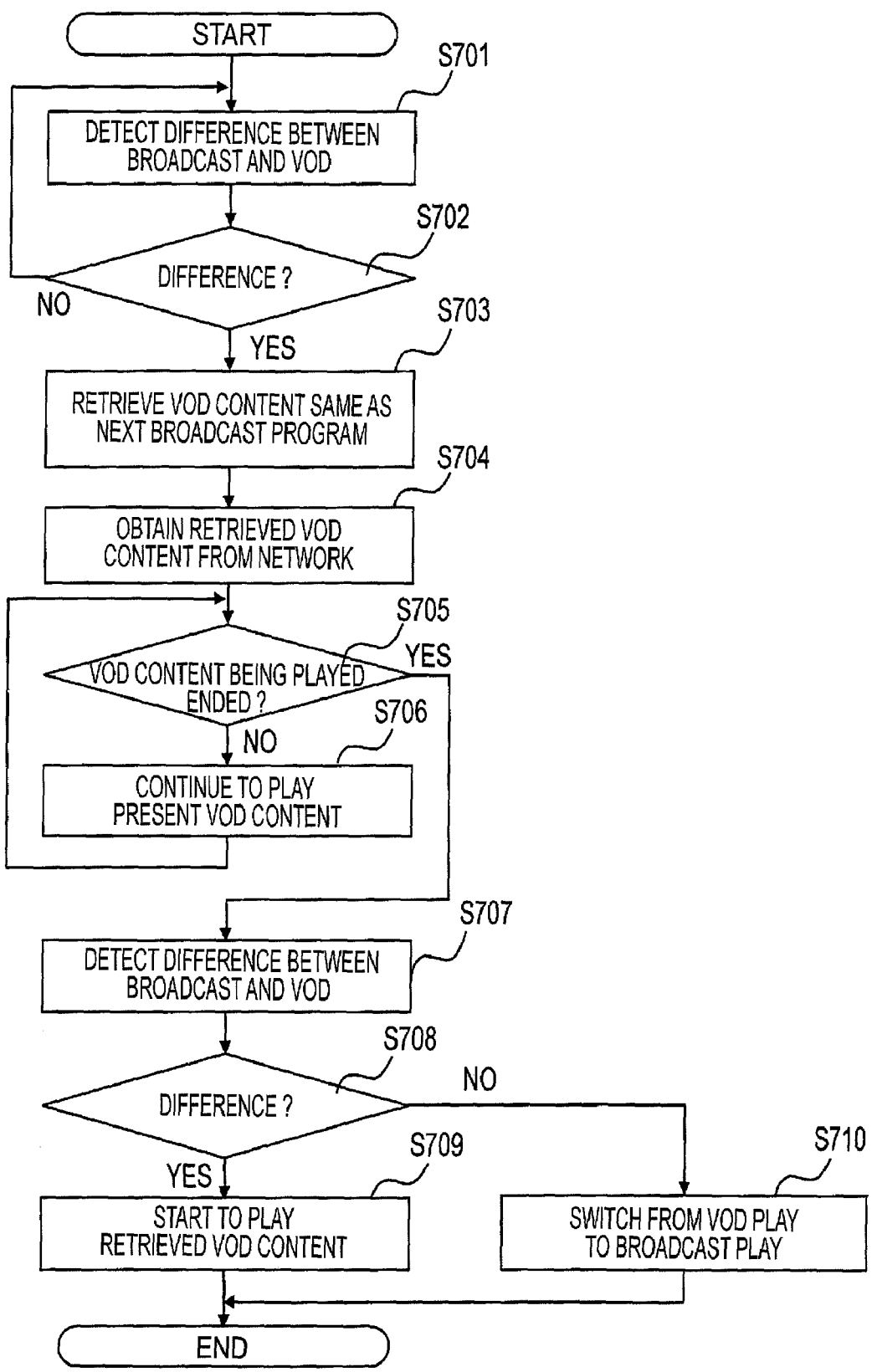
FIG. 7 is a flowchart showing the steps of the process executed at the end of the play of the VOD content according to a first embodiment of the invention.

FIG. 7 is a diagram showing the process executed during and at the end of the VOD content play in the state switched to the VOD content play but not to the viewing of the broadcast program of the broadcast wave. The processing flow of FIG. 7 is realized by the collaboration between the function blocks shown in FIG. 1. Each step shown in FIG. 7 is described in detail below.

First, in step S701, the difference is detected between the progress position of the broadcast program being broadcast and the VOD play position. The process of step S701 is executed by the difference detection unit 106 shown in FIG. 1. Also, this difference detection method is carried out based on the program progress correspondence table described above.

Next, step S702 judges whether a difference has developed or not, and in the absence of a difference, the process of step S701 is executed again. Specifically, steps S701 and S702 indicate that the difference detection process is steadily carried out during the VOD content reproduction (play). Incidentally, the process of step S702 is executed by the difference detection unit 106 shown in FIG. 1.

Upon detection of a difference in step S702, the VOD content having the same content as the next broadcast program scheduled to be started following the current program being broadcast is retrieved in step S703. The process of step S703 is executed by the content search unit 107 shown in FIG. 1. The search process is triggered in such a manner that upon detection of the occurrence of the difference in step S702, the difference detection signal is transmitted to the usability judgment unit 108 shown in FIG. 1, after which the usability judgment unit 108 triggers the content search unit 107. The content search unit 107, upon reception of the search command, first obtains, from the program information management unit 105 shown in FIG. 1, the information on the next program started following the current program being broadcast. A specific example of this information is the one described in EIT (Event Information Table), a kind of SI (Service Information) superposed on the broadcast wave. This information is periodically received by the broadcast reception/play unit 101 shown in FIG. 1 and accumulated in the program information management unit 105. Next, the content search unit 107, through the network card 9 of FIG. 1 and utilizing the obtained program information, executes the process of retrieving the corresponding VOD content from the VOD server 4 located on the network 3 shown in FIG. 18. The result of search is transmitted to the usability judgment unit 108 from the content search unit 107. The search result thus transmitted includes the information indicating whether the content having the same content exists in the VOD server 4 and, if it exists so, the URI information thereof.

Next, in step 704, the usability judgment unit 108, based on the result obtained from the content search unit 107, issues a VOD content obtaining command to the VOD reception/play unit 102. The VOD reception/play unit 102 obtains the VOD content from the network 3 in accordance with the VOD content obtaining command.

Step S705 judges whether the VOD content play has ended or not. The length of the VOD content can be obtained from the program progress correspondence table described above. Upon judgment in step S705 that the VOD content play has ended, the process proceeds to step S707. In the case where the VOD content play is yet to end, on the other hand, as shown in step S706, the VOD content continues to be played, until the repetitive judgment in step S705 as to whether the VOD content play is ended or not. The process of judging whether or not the VOD content play is ended is executed by the play control unit 109 shown in FIG. 1. The result of judgment is transmitted to the usability judgment unit 108.

In step S707, like in step S701, the difference detection process is executed.

Step S708, like step S702, judges whether the difference exists or not. Upon judgment in step S708 that the difference exists, the process proceeds to step S709, otherwise, to step S710. The difference detection process of steps S707 and S708 is executed by the difference detection unit 106 shown in FIG. 1.

In step S709, the process is executed so that the VOD content obtained in step S704 is played following the end of the VOD content being played. In step S709, first, a VOD content play control command is transmitted to the play control unit 109 shown in FIG. 1 from the usability judgment unit 108 shown in FIG. 1. The information thus transmitted is for designating the VOD content obtained in step S704. The play control unit 109, in response to the command from the usability judgment unit 108, instructs the VOD reception/play unit 102 shown in FIG. 1 to play the VOD content already obtained. At the same time, the play control unit 109 instructs the input switching unit 110 shown in FIG. 1 to continue to play the VOD image. Due to the process executed in step S709, the VOD content having the same content as the next broadcast program obtained in advance starts to be played at the end of the VOD content being played.

Upon judgment in step S708 that there is no difference, step S710 executes the process of switching to the reproduction of the broadcast program after the end of the VOD content play. The process of step S710 is started when the usability judgment unit 108 receives the notification from the play control unit 109 of FIG. 1 that the VOD content play has ended. After that, the usability judgment unit 108 issues a tuning command to the tuning control unit 104. The broadcast channel selected thereby is the one selected already before starting the play of the VOD content. After that, the tuning control unit 104 instructs the input switching unit 110 to switch to the video display of the broadcast channel. The input switching unit 110 switches to the video display of the broadcast channel in accordance with this command.

(State Transition Due to Difference)

With reference to FIGS. 8 and 9, an explanation is given about a particular state to which the transition is made at the end of the VOD content play in the case where the difference exists between the progress position of the program being broadcast and the VOD play position as the result of the process execution shown in FIG. 7. FIG. 8 shows a case in which the progress of the program being broadcast is delayed behind the VOD play position, and FIG. 9 a case in which the progress of the program being broadcast is ahead of the VOD play position.

In FIG. 8, the broadcast channel 806 contains the broadcast program 801 and the next broadcast program 802 following the broadcast program 801. Also, the VOD content having the same content as the broadcast program 801 is the VOD program 803, and the VOD content having the same content as the next broadcast program 802 is the next VOD program 804. As shown in FIG. 8, a difference 805 is developed in the case where the VOD program 803 being played is advanced ahead of the broadcast program 801. With this difference 805, assume that the broadcast channel 806 is selected after the end of play of the VOD program 803. The content of the content already viewed in the VOD program 803 would be undesirably viewed in the broadcast program 801 for the length of the difference 805. In the presence of the difference, however, as shown in the flowchart of FIG. 7, the next VOD program 804 constituting the VOD content having the same content as the next broadcast program is obtained in advance, and by reproducing the next VOD program 804 following the play of the VOD program 803, the problem described above is solved. Incidentally, the next VOD program 804 is the content obtained in step 704 shown in FIG. 7.

In FIG. 9, the broadcast channel 906 includes the broadcast program 901 and the next broadcast program 902. Also, the VOD content having the same content as the broadcast program 901 is the VOD program 903, and the VOD content having the same content as the next broadcast program 902 is the next VOD program 904. As shown in FIG. 9, the difference 905 is developed in the case where the VOD program 903 being played is delayed behind the broadcast program 901. In the case where the broadcast channel 906 is selected at the end of play of the VOD program 903 in the presence of the difference 905, the head portion of the broadcast program 902 as long as the difference 905 would be missed. In the presence of the difference, however, as shown in the flowchart of FIG. 7, the next VOD program 904 constituting the VOD content having the same content as the next broadcast program is obtained in advance, and by reproducing the next VOD program 904 following the play of the VOD program 903, the problem described above is solved. Incidentally, the next VOD program 904 is the content obtained in step 704 shown in FIG. 7.

As described above, the first embodiment of the invention can obviate the various inconveniences for the user which otherwise would be caused at the end of the VOD content play in the case where the viewing is switched to the VOD content in response to the play control request from the user during the viewing of the broadcast program.

<Second Embodiment>

A second embodiment of the invention is described below with reference to the drawings. The second embodiment relates to a method effectively applicable in the case where the method described in the first embodiment cannot be used in the state in which the VOD content having the same content as the broadcast program is played ahead of the progress of the broadcast program. The case shown in FIG. 6 above is an example of the state discussed in the second embodiment in which the VOD content being played is ahead of the progress of the broadcast program.

In order to realize the second embodiment, the receiving apparatus 1 and the peripheral devices are connected to each other similarly to the first embodiment shown in FIG. 18. The internal configuration of the receiving apparatus 1 is also similar to that shown in FIG. 19. Also, the internal function blocks of the main decoder 7 shown in FIG. 19 are also similar to those of the first embodiment shown in FIG. 1. Therefore, the function blocks shown in FIGS. 18, 19 and 1 are not described any further.

The transition of viewing from the broadcast program to the VOD content constituting the prerequisite for carrying out the second embodiment is also similar to that shown in the flowchart of FIG. 3 according to the first embodiment described above. Therefore, the transition to the VOD content is neither described any further.

The steps of the process executed according to the second embodiment of the invention at the end of the VOD content being played in the case where the VOD content play is ahead of the progress of the broadcast program is described with reference to the flowchart of FIG. 10.

Figure 10A:
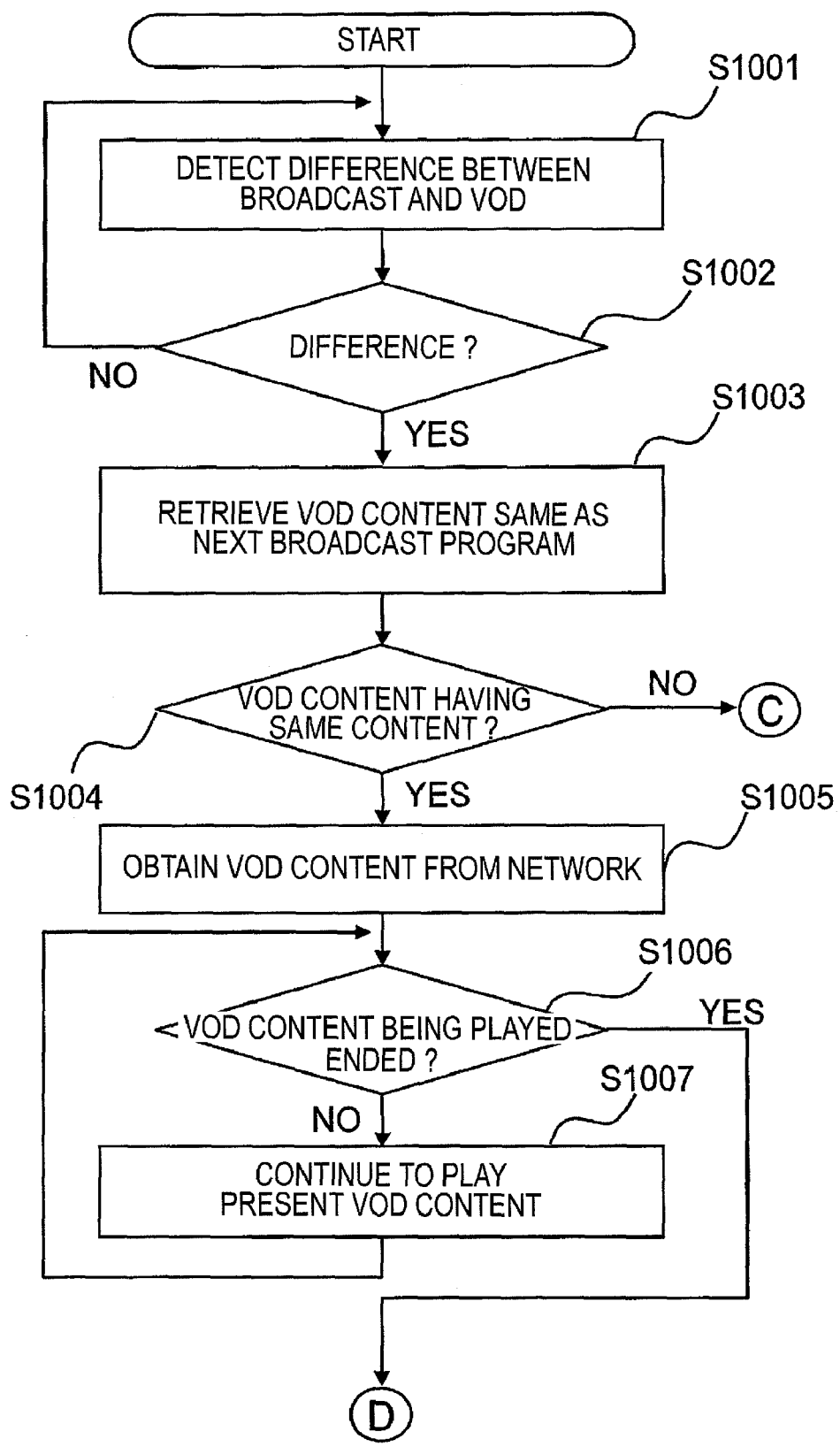
FIG. 10 is a flowchart showing the steps of the process executed at the end of the VOD content play according to a second embodiment of the invention.
Figure 10B:
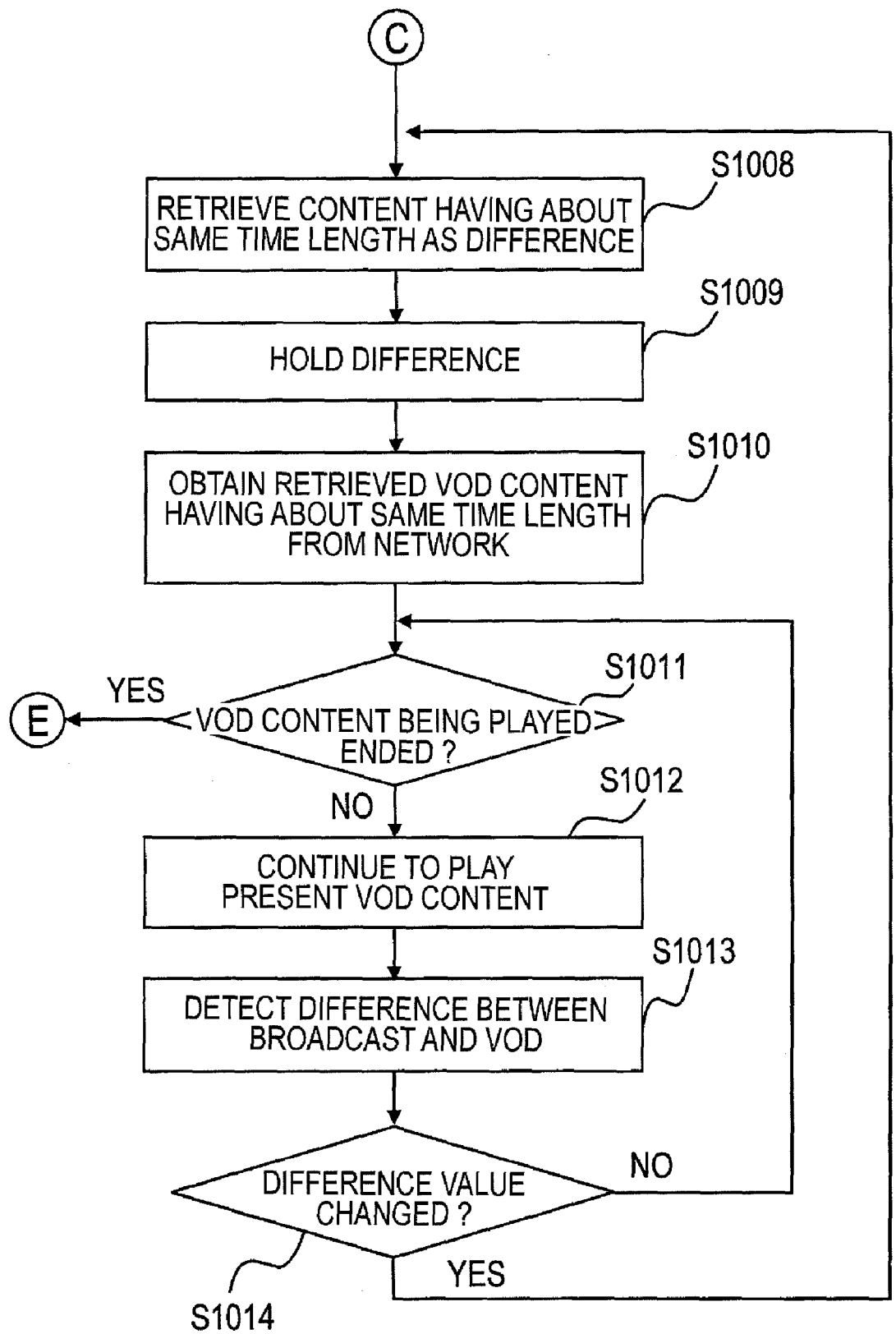
Figure 10C:
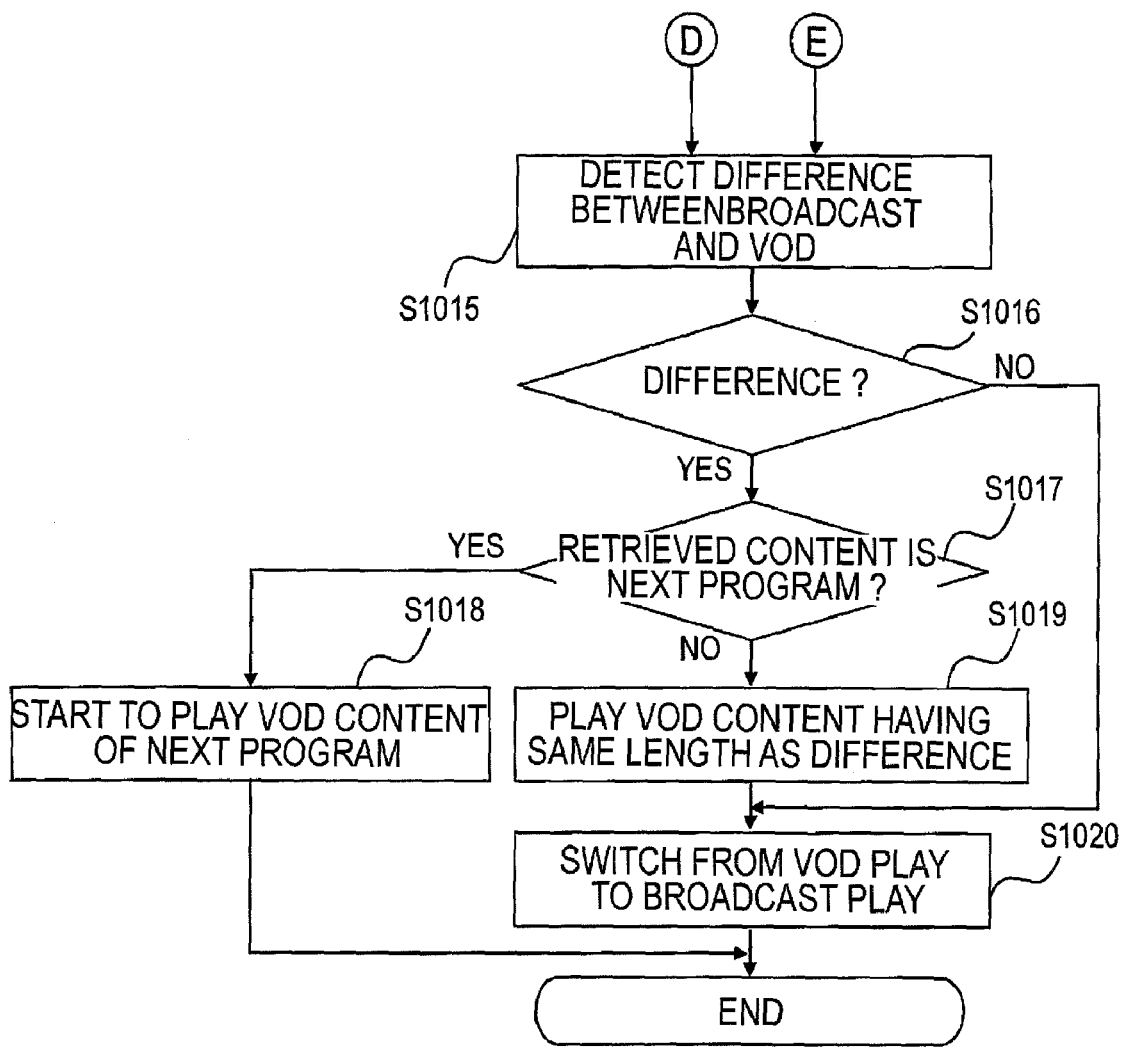

FIG. 10 is a diagram showing the steps of the process executed during and at the end of the play of the VOD content in the case where the operation is switched to the VOD content play instead of to the viewing of the broadcast program of the broadcast wave. The process shown in FIG. 10 is realized by the collaboration between the function blocks shown in FIG. 1. The steps of the process shown in FIG. 10 are described in detail individually.

First, in step S1001, the difference is detected between the progress position of the broadcast program being broadcast and the VOD play position. The process of step S1001 is executed by the difference detection unit 106 shown in FIG. 1. Also, the difference detection method is carried out based on the program progress correspondence table described above.

Next, step S1002 judges whether a difference is developed or not, and in the absence of the difference, the process of step S1001 is executed again. Specifically, steps S1001 and S1002 show that the difference detection process is steadily conducted during the VOD content play. The process of step S1002 is carried out by the difference detection unit 106 shown in FIG. 1.

Upon detection of a difference in step S1002, step S1003 retrieves the VOD content having the same content as the next broadcast program scheduled to be started following the broadcast program being broadcast. The process of step S1003 is carried out by the content search unit 107 shown in FIG. 1. Also, the search process is triggered in such a manner that upon detection of a difference in step S1002, the difference detection signal is transmitted to the usability judgment unit 108 shown in FIG. 1, after which the usability judgment unit 108 issues a search command to the content search unit 107. The content search unit 107, upon reception of the search command, first obtains the information on the next program following the program being broadcast, from the program information management unit 105. Then, the content search unit 107, using the obtained program information, executes the process of retrieving the corresponding VOD content from the VOD server 4 located on the network 3 shown in FIG. 18. The search result is transmitted from the content search 107 to the usability judgment unit 108. The search result thus transmitted includes the information indicating whether the corresponding content exists in the VOD server 4 and the URI information in the presence of the corresponding content.

Step S1004 searches the VOD server for the content of the same content and judges whether such content is found or not. The process of step S1004 is carried out by the usability judgment unit 108 shown in FIG. 1. Upon judgment that the content of the same content is available on the VOD server 4, the process proceeds to step S1005. Upon judgment that the content of the same content is not available, on the other hand, the process proceeds to step S1008.

In step S1005, the usability judgment unit 108 issues a command to the VOD reception/play unit 102 to obtain the VOD content based on the search result obtained from the content search unit 107. In accordance with the obtaining command, the VOD reception/play unit 102 obtains the VOD content from the network 3 shown in FIG. 18.

Step S1006 judges whether the VOD content being played has ended or not. The length of the VOD content can be obtained from the program progress correspondence table described above. Upon judgment in step S1006 that the VOD content play has ended, the process proceeds to step S1015. Upon judgment that the VOD content play has yet to end, on the other hand, the VOD content continues to be played as indicated by step S1007, followed by the judgment again in step S1006 whether the VOD content play has ended or not. The process of judging in step S1006 whether the VOD content play is ended or not is carried out by the play control unit 109 shown in FIG. 1. Also, the judgment result is transmitted to the usability judgment unit 108 from the play control unit 109.

The steps of the process executed upon judgment in step S1004 that the content of the same content cannot be found on the VOD server are described below.

Step S1008 executes the process of searching the VOD server for the content having substantially the same length as the difference. The detail of this content search process is similar to but different only in the search condition thereof from that of step S1003. In step S1003, the program having the same content as the next program following the program being broadcast is designated as the search condition. In step S1008, on the other hand, the content having about the same time length as the difference detected in step S1001 is designated as the search condition. The wording "about the same time length" indicates that the precision on the order of seconds is not required. Also, the content of the content searched for is described later. An example of the content searched for includes a CF, an information program for a short time or one corner (scene) in the VOD content.

Step S1009 executes the process of temporarily holding the difference value used for the search. This difference value is temporarily held in the memory 11 shown in FIG. 19. The process of holding the difference value shown in step S1009 is carried out by the usability judgment unit 108.

In step S1010, the VOD content retrieved is obtained from the VOD server 4 on the network 3 shown in FIG. 18. The process executed in step S1010 is similar to the process executed in step S1005.

Step S1011 judges whether the VOD content play has ended or not. The process of step S1011 is similar to the process executed in step S1006. Upon judgment in step S1011 that the VOD content play is ended, the control proceeds to step S1015. In the case where the VOD content play has yet to end, on the other hand, the control proceeds to step S1012 and the VOD content continues to be played.

Step S1013 executes the process of detecting again the difference between the progress position of the broadcast program and the VOD play position. The process of step S1013 is similar to the process executed in step S1001.

In step S1014, the difference value obtained in step S1013 is compared with the difference value stored in step S1009. In the case where the differences compared are different from each other, step S1008 searches for the content having about the same time length as the difference obtained newly again. In the case where the difference value compared is not changed, the control proceeds to step S1011, and the process of judging whether the VOD content play is ended or not is repeated. Incidentally, the difference comparison process in step S1014 is carried out by the usability judgment unit 108.

In the case where the VOD content is completely played, the difference detection process similar to step S1001 is executed in step S1015.

Step S1016, like step S1002, judges whether a difference exists or not. Upon judgment in step S1016 that a difference exists, the process proceeds to step S1017, otherwise, to step S1020.

Step S1017 judges whether the content retrieved from the VOD server has the same content as the next program to be broadcast or has about the same time length as the difference. The judgment in step S1017 is carried out by the usability judgment unit 108 shown in FIG. 1. Also, the judgment as to which of the two content types described above is carried out, in accordance with the instruction from the usability judgment unit 108, based on the information recorded in the memory 11 shown in FIG. 19. In the case where step S1017 judges that the content retrieved has the same content as the next broadcast program, the process proceeds to step S1018. In the case where step S1017 judges that the VOD content retrieved has about the same time length as the difference, on the other hand, the process proceeds to step S1019.

Step S1018 executes the process in which the VOD content obtained in step S1005 is reproduced continuously after the end of the VOD content being played. In the process of step S1018, first, the usability judgment unit 108 shown in FIG. 1 issues a VOD content play control command to the play control unit 109 shown in FIG. 1. The information thus transmitted is for designating the VOD content obtained in step S1005. The play control unit 109, in response to the command from the usability judgment unit 108, controls the VOD reception/play unit 102 shown in FIG. 1 to play the VOD content already obtained. At the same time, the play control unit 109 transmits a command to the input switching unit 110 shown in FIG. 1 to continue to play the VOD image. The process executed in step S1018 starts the play of the VOD content having the same content as the next broadcast program after the end of the VOD content being played.

Step S1019 executes the process of reproducing the VOD content having about the same time length as the difference, continuously after the end of the VOD content being played. The process executed in step S1019 is similar to but different only in the content played from the process of step S1018.

Upon judgment in step S1016 that there is no difference or after the end of play of the VOD content having about the same length as the difference in step S1019, step S1020 executes the process of switching to the play of the broadcast program. The process of step S1020 is started with the usability judgment unit 108 receiving the notification from the play control unit 109 shown in FIG. 1 that the play of the VOD content is ended. After that, the usability judgment unit 108 issues a tuning command to the tuning control unit 104. The broadcast channel selected in this case is the one already selected before starting the play of the VOD content. After that, the tuning control unit 104 issues a command to the input switching unit 110 to switch to the video display of the broadcast channel. In compliance with this command, the input switching unit 110 switches the operation to the video display of the broadcast channel.

(State Transition With Difference)

The state after transition made by the process shown in FIG. 10 at the end of the VOD content play in the presence of a difference between the progress position of the broadcast program being broadcast and the VOD content play position is shown in FIG. 11. FIG. 11 is a diagram for explaining a case in which the progress of the program being broadcast is delayed behind the VOD play position in the absence of the VOD content having the same content as the next broadcast program.

In FIG. 11, the broadcast channel 1106 includes a broadcast program 1101 and the next broadcast program 1102 immediately following the broadcast program 1101. The VOD content having the same content as the broadcast program 1101 is the VOD program 1103. As shown in FIG. 11, a difference 1105 is developed in the case where the VOD program 1103 being played is ahead of the broadcast program 1101. In the case where the broadcast channel 1106 is selected at the end of play of the VOD program 1103 in the presence of the difference 1105, the content viewed already in the VOD program 1103 would be undesirably viewed again in the broadcast program 1101 by the length of the difference 1105. In the case where the VOD content having the same content as the program next to be broadcast cannot be found in the presence of the difference, however, the difference VOD content 1104 as long as the difference is obtained in advance as shown in the flowchart of FIG. 10, and by reproducing the particular VOD content 1104 following the reproduction of the VOD program 1103, the problem described above can be solved.

(VOD Content as Long as Difference)

A method of retrieving the content having about the same length as the difference is described below. Incidentally, the content having about the same length as the difference is retrieved in step S1008 shown in FIG. 10.

The content retrieved in step S1008 shown in FIG. 10 may be basically as long as the difference and not limited in any other way. In accordance with the play control operation of the user performed before the occurrence of the difference, however, the content to be retrieved is changed, so that the content more useful to the user can be retrieved.

Assume, for example, that the user frequently executes the CF skip operation in the play control operation with the result that the VOD content makes progress beyond the broadcast program. Another CF than the skipped one is used as the VOD content to be retrieved as a replacement of the difference. The reason is that the user may not be interested in the CF contained in the VOD content in which the CF is skipped. This method, therefore, can provide the user with a content considered at least more interesting to the user.

In the case where the VOD makes progress for another reason without the skipping of the CF by the play control operation, on the other hand, the same CF as the one contained in the VOD content is retrieved and supplied to the user. This method makes it possible for the user to repeatedly view the CF interesting to him/her, and the receiving apparatus 1 can provide the user with a content meaningful to him/her.

Incidentally, the foregoing explanation deals with an example of determination of the content type, to which the invention is not limited.

As described above, according to the second embodiment of the invention, the various disadvantages caused to the user at the end of the VOD content play can be obviated in the state where the viewing is switched to the VOD content at the play control request of the user while viewing the broadcast program.

Especially, it is effectively applicable to a case in which the VOD content having the same content as the scheduled next broadcast program cannot be obtained during the VOD content play and the VOD content play is ahead of the broadcast program.

<Third Embodiment>

A third embodiment of the invention is described below with reference to the drawings. The method according to the third embodiment is effectively applicable to a case in which the method according to the first embodiment cannot be used in the reproduction of the VOD content having the same content as the broadcast program while the reproduction of the VOD content is delayed behind the progress of the broadcast program. An example of the case according to the third embodiment in which the reproduction of the VOD content is delayed behind the progress of the broadcast program is described above with reference to FIG. 6.

The connection between the receiving apparatus 1 and the peripheral devices to realize the third embodiment is similar to the one of the first embodiment shown in FIG. 18. The internal configuration of the receiving apparatus 1 is also similar to the one shown in FIG. 19. Therefore, FIGS. 18 and 19 are not further described.

A function block diagram of the main decoder 7 for realizing the third embodiment is shown in FIG. 12. In FIG. 12, the function blocks having the function equivalent to those in FIG. 1 are designated by the same reference numerals, respectively, and will not be repeated. Only the new function blocks added to realize the third embodiment are described below.

A display image generating unit 1201, in accordance with the command from the usability judgment unit 108, executes the process of generating an image for displaying the various information such as a message to the monitor 6. The various information display images generated by the display image generating unit 1201 are transmitted to a synthesis unit 1203. A specific example of the message icon generated by the display image generating unit 1201 includes a message informing the user that the next broadcast program is started soon or a message indicating the method of starting the VOD content play. These messages are described in detail later.

In the case where the play of the VOD content is suspended, a suspension information recording unit 1202 records the suspension information making it possible to restart the play from the suspension point. The suspension information required for restarting the play includes the title of the VOD content of which the play is suspended, the URI and the time from the start of the VOD content play to the suspension point. The read/write operation of the suspension information is controlled by the play control unit 109. Also, the suspension information is stored in the memory 11 shown in FIG. 19.

The synthesis unit 1203 executes the process of synthesizing the display image generated by the display image generating unit 1201 and the broadcast image or the VOD content image transmitted from the input switching unit 110. The image thus synthesized is transmitted to the monitor 6 shown in FIG. 18 and presented to the viewer through the video output circuit 12 shown in FIG. 19.

The viewing transition process from the broadcast program to the VOD content presupposed in the third embodiment is similar to the process of the flowchart of FIG. 3 described above in the first embodiment. The transition to the VOD content play mode, therefore, is not described.

The steps of the process executed at the end of the reproduction of the VOD content delayed behind the progress of the broadcast program according the third embodiment are described with reference to the flowchart of FIG. 13.

Figure 13A:
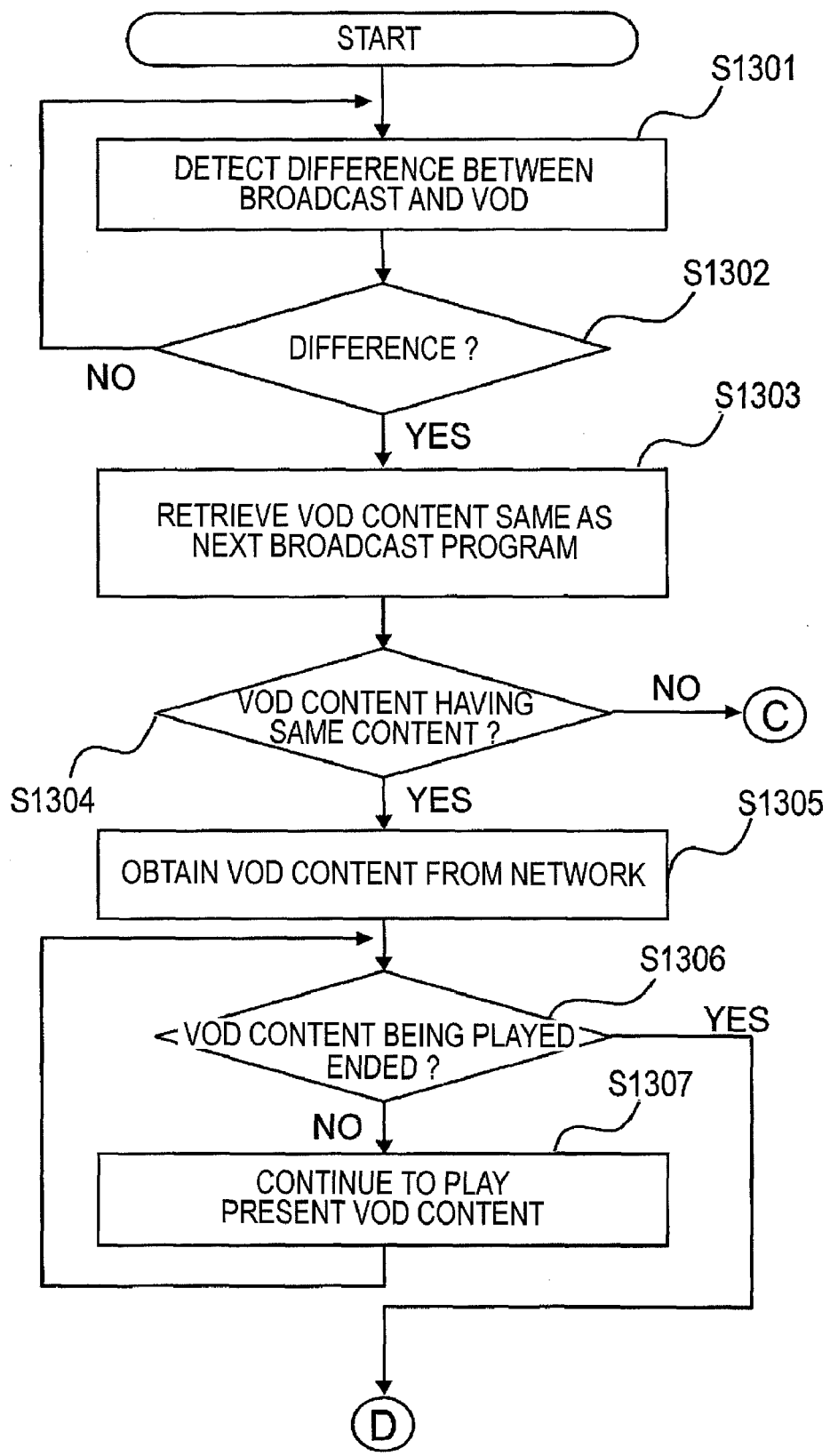
FIG. 13 is a flowchart showing the steps of the process executed at the end of the VOD content play according to a third embodiment of the invention.
Figure 13B:
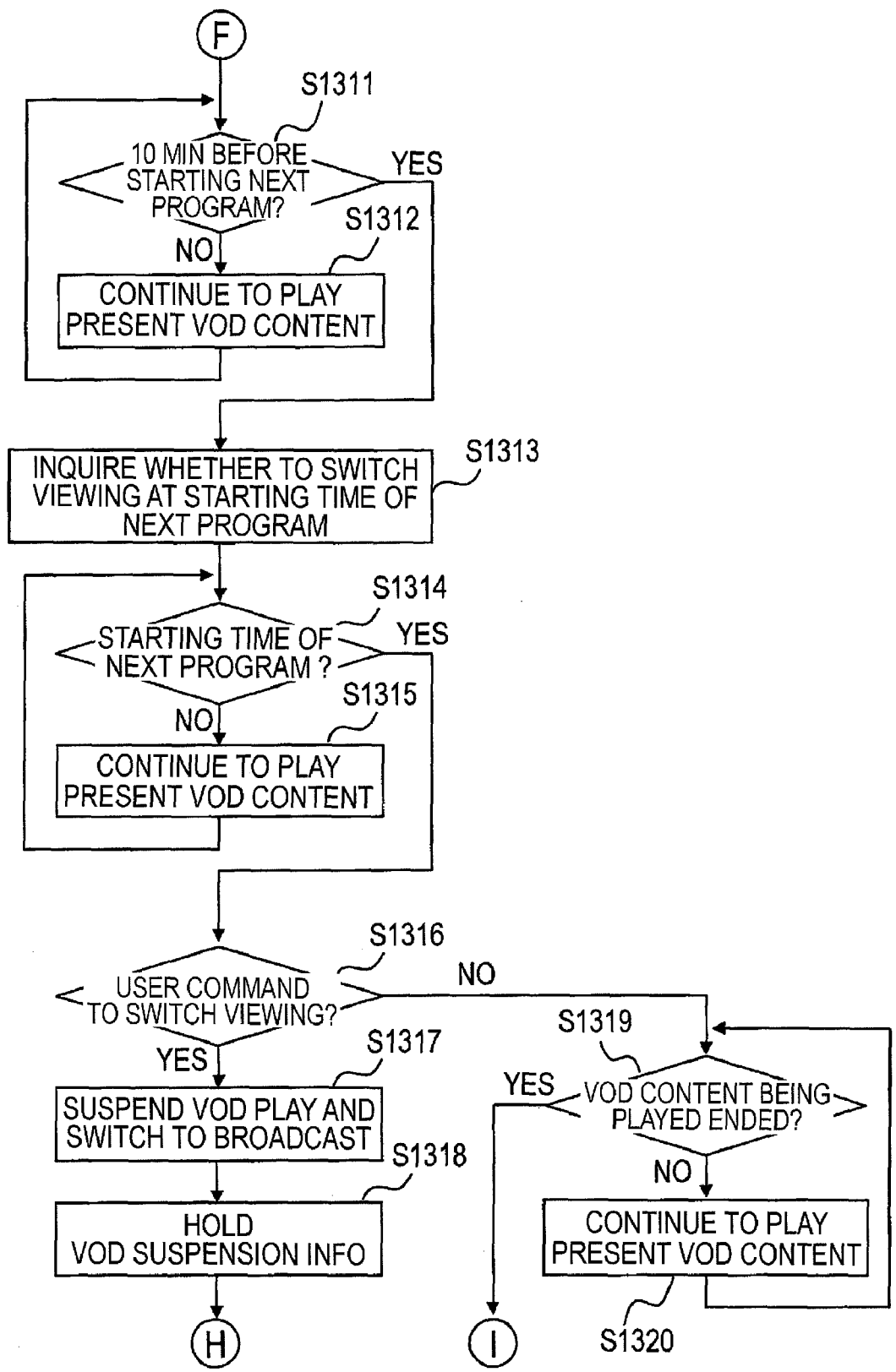
Figure 13C:
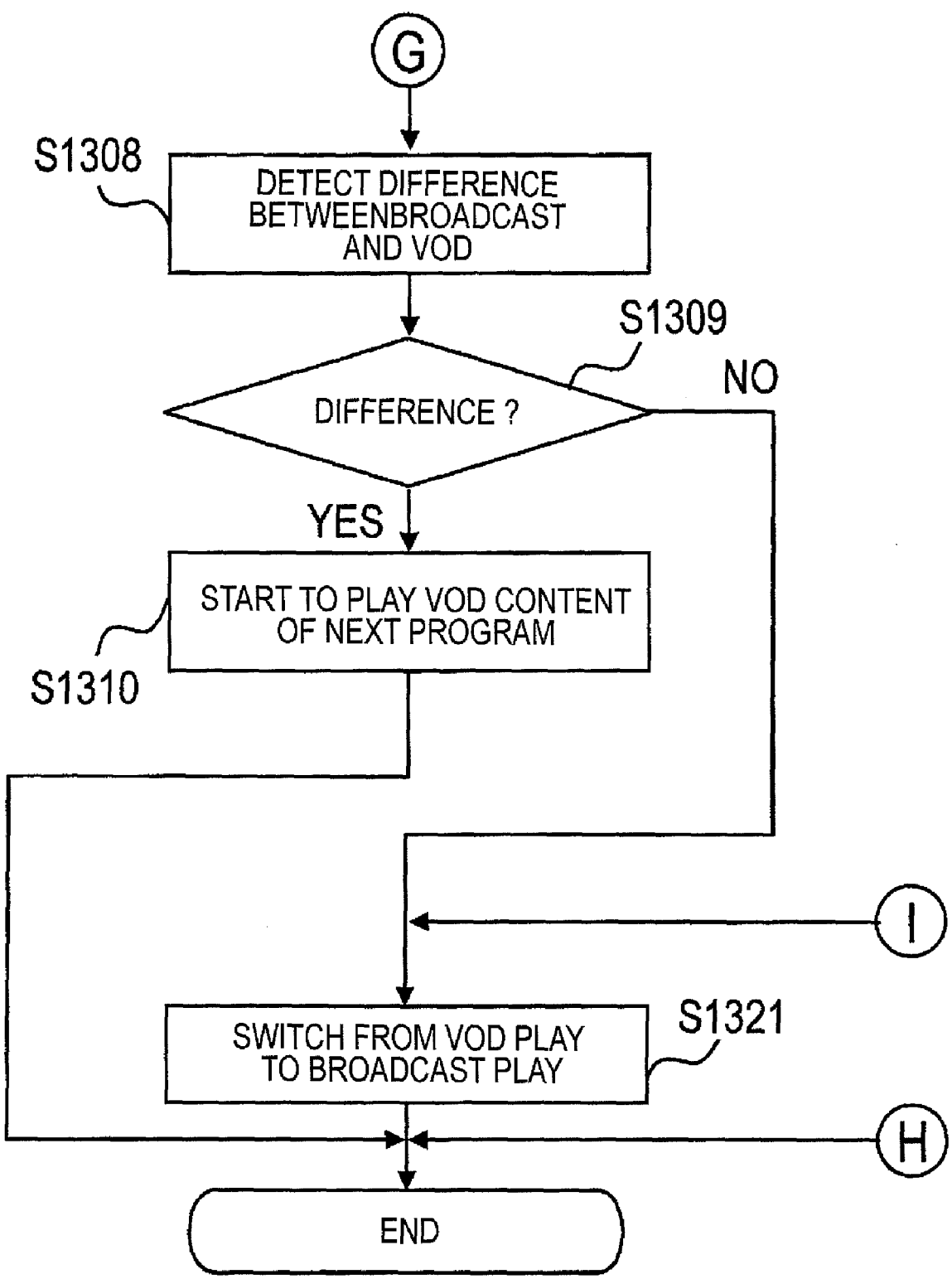

FIG. 13 is a diagram showing the process executed during or at the end of reproduction of the VOD content in the state in which the viewing is switched to the VOD content but not to the broadcast program of the broadcast wave. The processing flow shown in FIG. 13 is realized by the collaboration between the function blocks shown in FIG. 1. The steps shown in FIG. 13 are individually described in detail below.

First, in step S1301, a difference between the progress position of the program being broadcast and the VOD play position is detected. The process of step S1301 is executed by the difference detection unit 106 shown in FIG. 12. Also, the difference detection method is carried out in accordance with the program progress correspondence table.

Next, step S1302 executes the process of judging whether the difference is developed or not. In the case where no difference is developed, the process of step S1301 is executed again. Specifically, steps S1301 and S1302 indicate that the difference detection process is executed steadily during the VOD content reproduction.

Upon detection in step S1302 that a difference is developed, step S1303 retrieves the VOD content having the same content as the next broadcast program to be started following the broadcast program being broadcast. The process of step S1303 is executed by the content search unit 107 shown in FIG. 12. Also, the search process is triggered in such a manner that upon detection of a difference in step S1302, a difference detection signal is transmitted to the usability judgment unit 108 shown in FIG. 12, after which the usability judgment unit 108 issues a search command to the content search unit 107. The content search unit 107, upon reception of the search command, obtains the information on the next program to be started following the program being broadcast, from the program information management unit 105 shown in FIG. 12. Next, the content search unit 107, utilizing the program information thus obtained, executes the process of retrieving the corresponding VOD content from the VOD server 4 located on the network 3 shown in FIG. 18. The search result is transmitted to the usability judgment unit 108 from the content search unit 107. The search result thus transmitted includes the information as to whether the content having the same content is existent in the VOD server and, if present, the URI information thereof.

Step S1304 judges whether the content having the same content is found or not on the VOD server as the result of the search. The process of step S1304 is carried out by the usability judgment unit 108 shown in FIG. 12. Upon judgment that the content having the same content is available on the VOD server, the process proceeds to step S1305. Upon judgment that the content having the same content is not so available, on the other hand, the process proceeds to step S1311.

In step S1305, the usability judgment unit 108 issues a command to the VOD reception/play unit 102 to obtain the VOD content based on the result obtained from the content search unit 107. The VOD reception/play unit 102 obtains the VOD content from the network 3 in compliance with the obtaining command.

Step 1306 judges whether the VOD content play has ended or not. The length of the VOD content can be obtained from the program progress correspondence table described above. Upon judgment in step S1306 that the VOD content play is ended, the process proceeds to step S1308. In the case where the VOD content play has yet to be ended, on the other hand, the VOD content continues to be played as shown in step S1307, and the judgment is repeated in step S1306 whether the VOD content play is ended or not.

Upon complete reproduction of the VOD content being played, the difference detection process is carried out in step S1308 in similar fashion to step S1301.

Step 1309, like step S1302, judges whether a difference exists or not. Upon judgment in step S1309 that a difference exists, the process proceeds to step S1310, otherwise, to step S1321.

In step S1310, the VOD content obtained in step S1305 is reproduced continuously following the end of the VOD content being played. The process of step S1310 is started by transmitting a VOD content replay control command to the play control unit 109 shown in FIG. 12 from the usability judgment unit 108 shown in FIG. 12. The information transmitted includes the information designating the VOD content obtained in step S1305. The play control unit 109, in accordance with the command from the usability judgment unit 108, controls the VOD reception/play unit 102 shown in FIG. 12 to play the VOD content already obtained. At the same time, the play control unit 109 transmits a command to the input switching unit 110 of FIG. 1 to continue the reproduction of the VOD image. The process of step S1310 makes it possible to play the VOD content having the same content as the next broadcast already obtained, after the end of the VOD content being played.

Next, an explanation is given about the steps of the process executed in the case where the content having the same content cannot be found on the VOD server 4 shown in FIG. 18 in step S1304.

Step S1311 confirms the broadcast starting time of the next broadcast program following the broadcast program being broadcast and having the same content as the VOD content being played. The process of step S1311 is carried out by the usability judgment unit 108 shown in FIG. 12. In step S1311, the usability judgment unit 108 first obtains the starting time of the next broadcast program from the program information management unit 105 shown in FIG. 12 on the one hand and the present time point from the broadcast reception/play unit 101 on the other hand. The present time point is compared with the starting time of the next broadcast program, and the process proceeds to step S1313 ten minutes before starting the next broadcast program. In the case where the comparison result is shorter than ten minutes, step S1312 continues to play the VOD content and the time confirmation in step S1311 is repeated. In FIG. 13, the length of 10 minutes is only an example and may be replaced by another time length.

Figure 14:
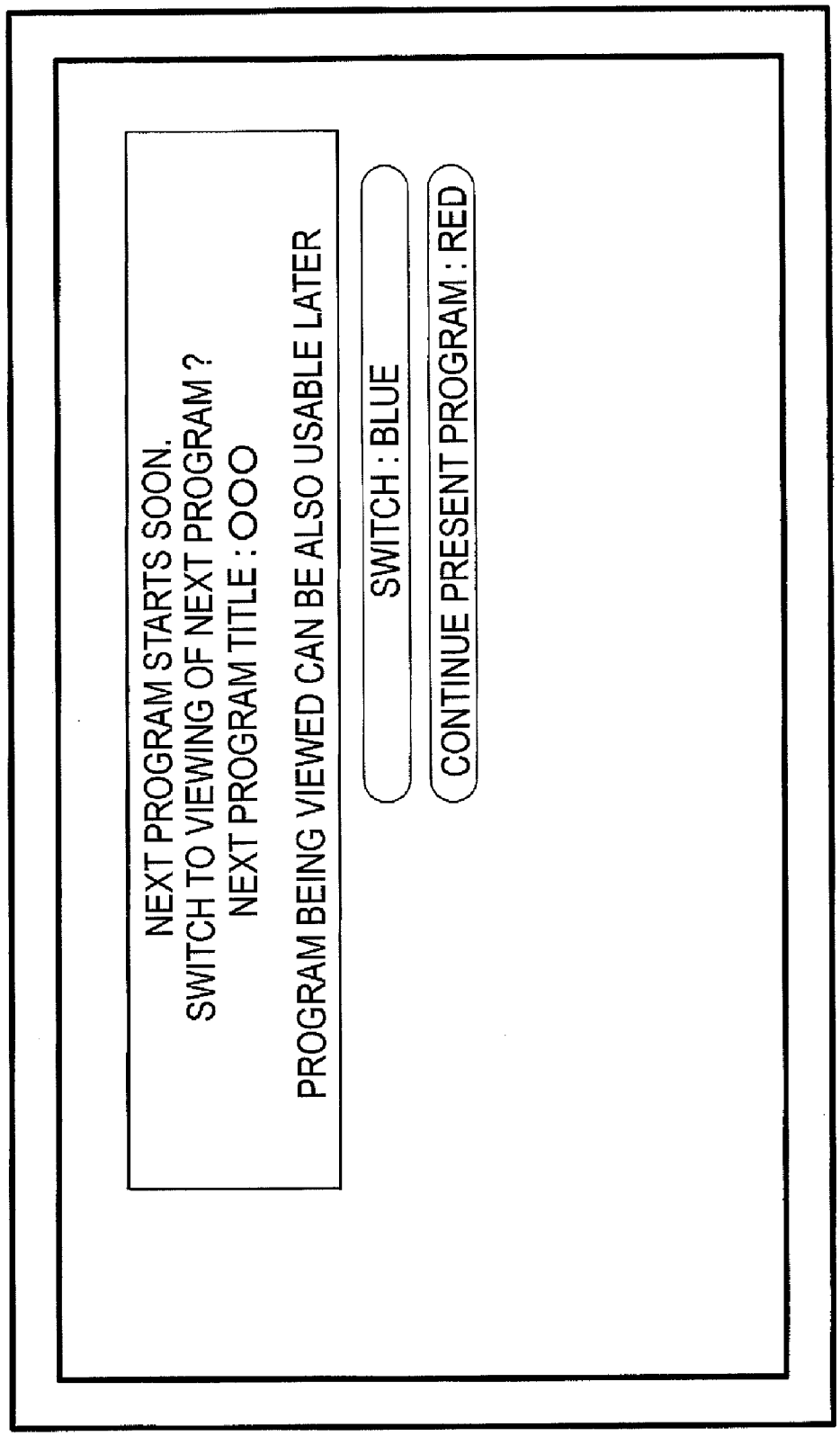
FIG. 14 shows an image of an example of the screen for displaying a message to the user.

Once the time to start the next broadcast program is reached in step S1313, the receiving apparatus 1 suspends the play (reproduction) of the VOD content and issues a message to the user urging him/her to decide whether the viewing is to be switched to the broadcast program or not. The process of step S1313 is carried out by the usability judgment unit 108, the display image generating unit 1201 and the synthesis unit 1203. First, the usability judgment unit 108 sends a message generation request to the display image generating unit 1201. The display image generating unit 1201, in accordance with the request, generates and transmits a display image to the synthesis unit 1203. The synthesis unit 1203 synthesizes the reproduced image of the VOD content with the image generated by the display image generation unit 1201 and outputs it to the monitor 6 through the video output circuit 12 shown in FIG. 19. The image after synthesis is shown in FIG. 14.

Step S1314 judges whether the time to start the next broadcast program has been reached or not. The process of step S1314 is equivalent to the process of step S1311 for comparing the present time with the time to start the next broadcast program. Upon judgment in step S1314 that the time to start the broadcast program is reached, the process proceeds to step S1316. As long as the time to start the next broadcast program has yet to be reached, on the other hand, the VOD content continues to be played in step S1315, and the judgment as to whether the time to start the next broadcast program is reached or not is repeated in step S1314.

Step 1316 judges whether a tuning command is issued from the user by the time of arrival at the time to start the next broadcast program. Although a message is presented to the user urging him/her to make the decision in step S1313, the subsequent user commands are judged in step S1316. Each user command is transmitted to the usability judgment unit 108 through the user interface unit 103 shown in FIG. 12. In the case where the user issues a command to switch to the reproduction of the broadcast wave with the arrival of the time to start the next broadcast program, the process proceeds to step S1317. Otherwise, the process proceeds to step S1319.

In step S1317, the VOD content play is suspended and switched to the play process of the broadcast wave play. At the same time, the VOD suspension information is held in step S1318 in order to make the VOD content play suspension point usable subsequently. The process executed in step S1318 is realized by the play control unit 109 issuing a suspension information write request to the suspension information recording unit 1202. Incidentally, the suspension information is described above.

Steps S1319 and S1320 judge whether the VOD content being played has ended or not. In the case where the VOD content being played is ended, the process proceeds to step S1321.

Step S1321 executes the process of switching to the reproduction of the broadcast program. The process of step S1321 is started by the usability judgment unit 108 receiving the message that the VOD content play is ended, from the play control unit 109 shown in FIG. 12. After that, the usability judgment unit 108 issues a tuning command to the tuning control unit 104. The broadcast channel selected in this case is the one already selected before starting the VOD content play. After that, the tuning control unit 104 issues a command to the input switching unit 110 to switch to the video display of the broadcast channel. The input switching unit 110 switches to the video display of the broadcast channel in response to the command.

(State Transition With Difference)

Figure 15:
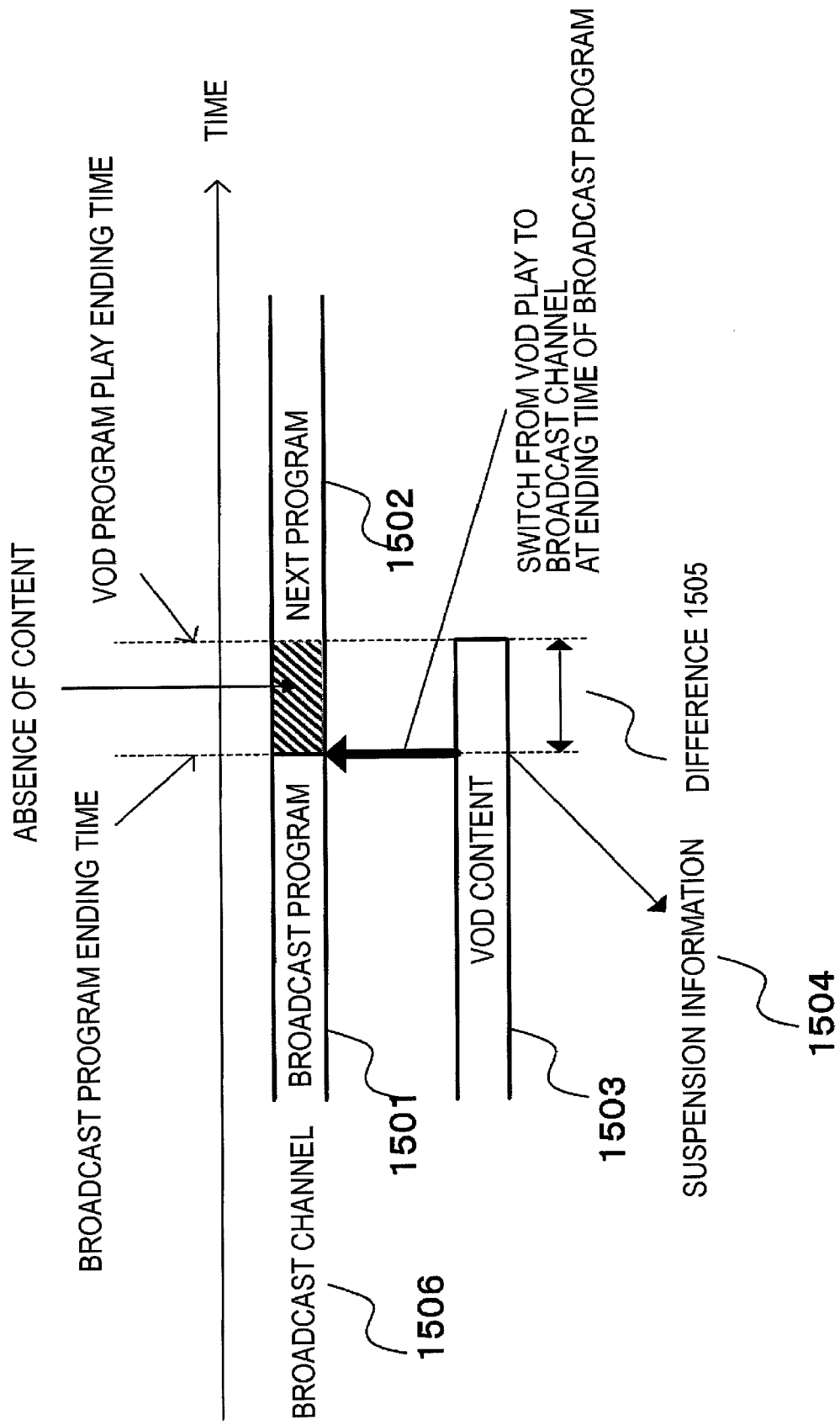
FIG. 15 is a diagram for explaining the state after the VOD content play in the case where the VOD content play position is behind the broadcast program play position according to the third embodiment.

In the case where a difference exists between the progress position of the broadcast program being broadcast and the VOD play position in the process shown in FIG. 13, the state after transition at the end of the VOD content play is shown in FIG. 15. FIG. 15 is a diagram for explaining a case in which the VOD content of the next broadcast program is not existent with the broadcast program ahead of the VOD content play position. An explanation is also made about a case in which an affirmative response is obtained from the user in return to the inquiry about the channel selection in step S1313 as described above in FIG. 13.

In FIG. 15, the broadcast channel 1506 includes the broadcast program 1501 and the next broadcast program 1502. Also, the VOD content having the same content as the broadcast program 1501 is the VOD program 1503. As shown in FIG. 15, a difference 1505 is developed in the case where the VOD program 1503 being played is delayed behind the broadcast program 1501. In the case where the broadcast channel 1506 is selected at the end of the reproduction of the VOD program 1503 with this difference 1505, the leading portion of the broadcast program 1502 would be missed by the length of the difference 1505. As shown in the flowchart of FIG. 13, however, the confirmation of the user is sought for channel selection in the absence of the VOD content having the same content as the next broadcast program with a difference. Upon reception of a "tuning" command from the user, the operation is switched to the broadcast channel 1506 with the arrival at the broadcast program ending time. The suspension information 1504 of the VOD program 1503 is held at the same time. As shown in FIG. 15, the next broadcast program 1502 can be viewed without being missed by switching to the broadcast channel 1506.

(Viewing Restart With Suspension Information)

Next, the flow of the process executed to use the suspension information held at the time of suspension of the VOD content is described with reference to FIG. 16.

Figure 16:
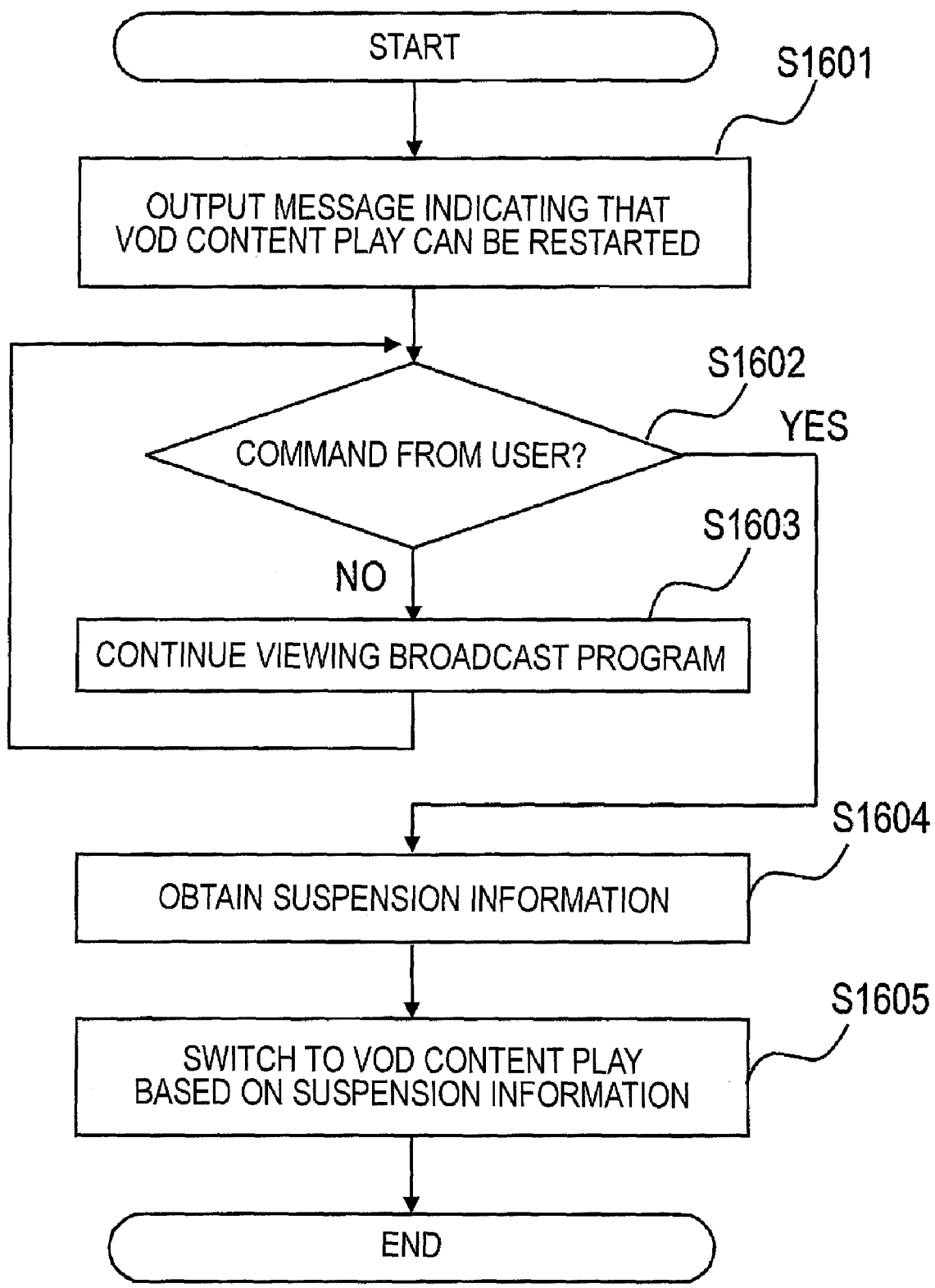
FIG. 16 is a flowchart showing the steps of the process for restarting the VOD content play.

FIG. 16 shows the flowchart of the process to restart the viewing of the suspended VOD content in the state of the operation switched to the viewing of the broadcast wave in response to the user command to suspend the VOD content.

Figure 17:
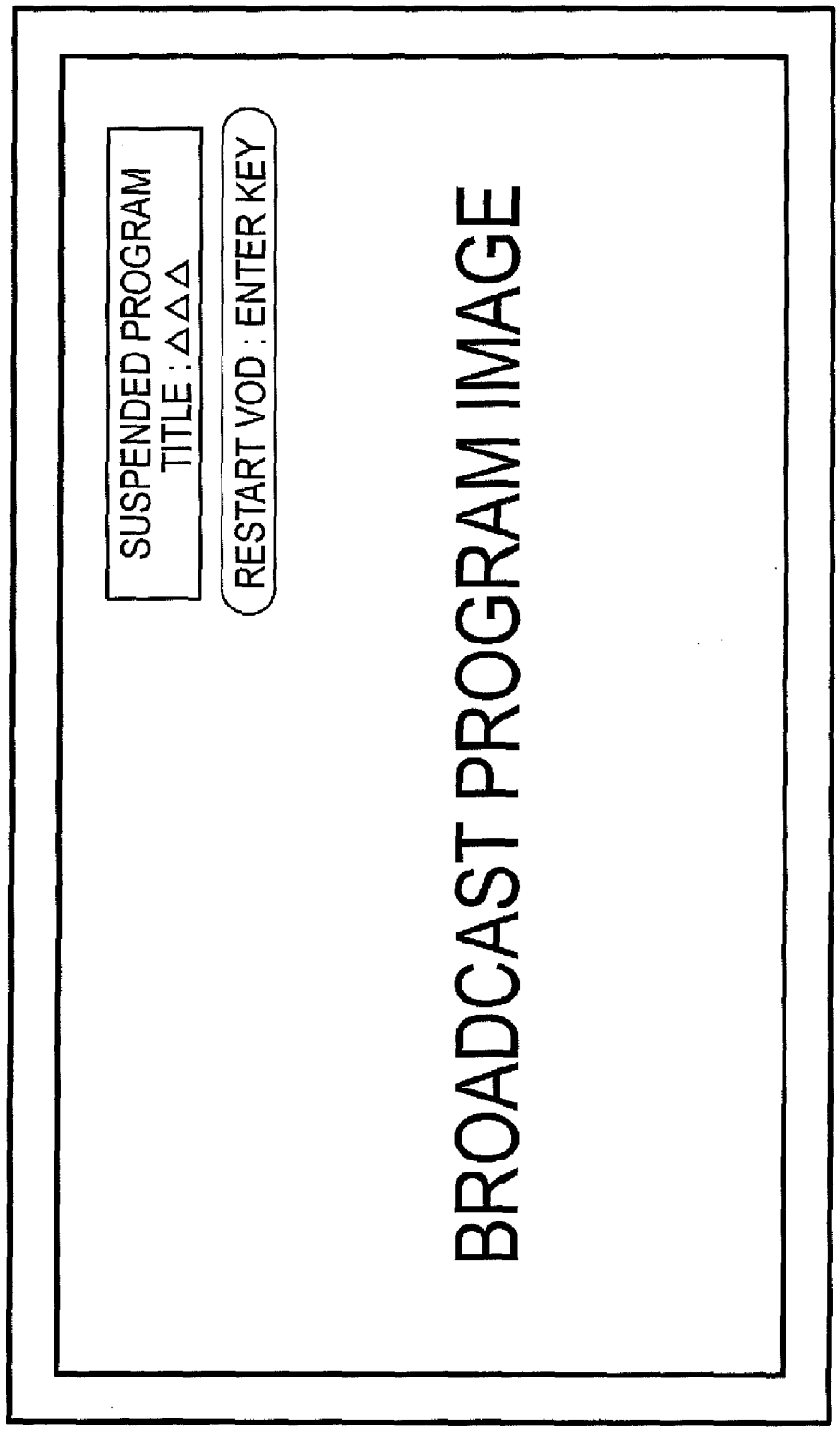
FIG. 17 shows an image of an example of the screen for displaying a message to the user.

First, step S1601 proposes to the user that the suspended VOD content play can be restarted. The proposition in step S1601 is made after the usability judgment unit 108 shown in FIG. 12 requests the display image generating unit 1201 to generate an image and the synthesis unit 1203 synthesizes the generated image with the broadcast image. The image of the screen presented to the user through the process of step S1601 is shown in FIG. 17. Incidentally, the image displayed in step S1601 may be configured to be erased upon lapse of a predetermined time.

Next, step S1602 confirms whether the user has performed the operation issuing a command to restart the play or not. The operation signal from the user is transmitted to the usability judgment unit 108 shown in FIG. 12 through the interface unit 103 shown in FIG. 12. In the case where the operation signal is generated from the user, the process proceeds to step S1604, while in the absence of the operation signal from the user, the broadcast program continues to be played in step S1603.

In the case where the user gives a command to restart the suspended program, the suspension information is read in step S1604. The suspension information is read from the suspension information recording unit 1202 shown in FIG. 12 by the play control unit 109 shown in FIG. 12. Incidentally, as described above, the suspension information is recorded also in the memory 11 shown in FIG. 19.

In step S1605, the play of the VOD content is restarted based on the suspension information that has been read. The process of step S1605 is carried out by the play control unit 109. The play control unit 109, usinq the suspension information read from the suspension information recording unit 1202, issues a command to the VOD reception/play unit 102 to restart the play of the VOD content. Also, the play control unit 109 issues a command to the input switching unit 110 to switch from the video display of the broadcast program to the video display of the VOD content.

As described above, according to the steps of the process shown in FIG. 16, the viewing of the VOD content can be easily restarted even in the case where the VOD content play is suspended in the flow of FIG. 13.

Also, as described above, according to the third embodiment of the invention, the various disadvantages against the user can be obviated which otherwise might be generated at the end of the VOD content play in the case where the viewing of the broadcast program is switched to the viewing of the VOD content in response to the play control request from the user.

Especially, this invention is effectively applicable to a case in which the VOD content is being played in the absence of the VOD content of the next scheduled broadcast program and the VOD content play is delayed behind the progress of the broadcast program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-94617, filed on Apr. 1, 2008, which is hereby incorporated by reference herein in its entirety.

What is claimed is:

1. A receiving apparatus comprising:
   a broadcast receiving unit which receives a broadcast signal including a first broadcast program through a first transmission path and reproduces a broadcast program from the received broadcast signal;
   a content data obtaining unit which obtains a video content data including a first video content data having the same content as the first broadcast program from a content data server through a second transmission path that is different from the first transmission path;
   a play unit which reproduces the video content data obtained by the content data obtaining unit;
   a difference detection unit which detects a difference between a broadcast ending time at which broadcast of the first broadcast program is to end and a reproduction ending time at which reproduction of the first video content data is to end in the case where the first video content data is being reproduced by the play unit; and
   a control unit which, in the case where the broadcast ending time of the first broadcast program is different from the reproduction ending time of the first video content data, controls the content data obtaining unit so as to obtain from the content data server through the second transmission path a second video content data having the same content as a second broadcast program to be broadcast following the first broadcast program, the first and second broadcast programs being broadcast on the same broadcast channel, and controls the play unit so as to reproduce the second video content data following the first video content data being played.

2. The receiving apparatus according to claim 1, wherein the control unit controls the broadcast receiving unit so as to reproduce the second broadcast program received through the first transmission path following the first video content data being played in the case where the result of detection by the difference detection unit shows no difference between the broadcast ending time of the first broadcast program and the reproduction ending time of the first video content data.

3. The receiving apparatus according to claim 1, wherein in the case where the first video content data being played ends earlier than the first broadcast program being broadcast and the second video content data having the same content as the second broadcast program cannot be obtained from the content data server through the second transmission path, then the control unit controls the content data obtaining unit so as to obtain a third video content data from the content data server through the second transmission path and controls the play unit so as to reproduce the third video content data during the period from the end of the first video content data being played to the start of the second broadcast program.

4. The receiving apparatus according to claim 3, wherein the control unit controls the content data obtaining unit so as to obtain from the content data server through the second transmission path, as the third video content data, a video content data having a time length equal to the difference between the broadcast ending time of the first broadcast program and the reproduction ending time of the first video content data.

5. The receiving apparatus according to claim 1, wherein in the case where the first video content data being played ends later than the first broadcast program being broadcast and the second video content data having the same content as the second broadcast program cannot be obtained from the content data server through the second transmission path, then the control unit suspends the reproduction of the first video content data and switches to the reproduction of the second broadcast program at the starting time of the second broadcast program.

6. The receiving apparatus according to claim 5, wherein the control unit causes the user to select whether the reproduction is switched from the first video content data to the second broadcast program.

7. The receiving apparatus according to claim 5, further comprising:
   a recording unit which records, in a storage unit, a suspension information required to restart the reproduction of the first video content data from a suspension point where the reproduction of the first video content data is suspended.

8. A control method of a receiving apparatus including a broadcast receiving unit which receives a broadcast signal including a first broadcast program through a first transmission path and reproduces a broadcast program from the received broadcast signal, a content data obtaining unit which obtains-a video content data including a first video content data having the same content as the first broadcast program from a content data server through a second transmission path that is different from the first transmission path and a play unit which reproduces the video content data obtained by the content data obtaining unit,
   the control method comprising:
   a detection step of detecting difference of between broadcast ending time at which broadcast of the first broadcast program is to be end and reproduction ending time at which reproduction of the first video content data is to be end in the case where the first video content data is being reproduced;
   a obtaining control step of controlling the content data obtaining unit so as to obtain, from the content data server through the second transmission path, a second video content data having the same content as a second broadcast program to be broadcast following the first broadcast program, the first and second broadcast programs being broadcast on the same broadcast channel, in the case where the broadcast ending time of the first broadcast program is different from the reproduction ending time of the first video content data; and
   a play control step of controlling the play unit so as to reproduce the second video content data following the first video content data being played.

9. The control method of the receiving apparatus according to claim 8,
wherein the play control step controls the broadcast receiving unit so as to reproduce the second broadcast program received through the first transmission path following the first video content data being played in the case where the result of detection in the detection step shows no difference between the broadcast ending time of the first broadcast program and the reproduction ending time of the first video content data.

10. The control method of the receiving apparatus, according to claim 8,
wherein in the case where the first video content data being played ends earlier than the first broadcast program being broadcast and the second video content data having the same content as the second broadcast program cannot be obtained from the content data server through the second transmission path, then the obtaining control step obtains a third video content data from the content data server through the second transmission path and the play control step controls the play unit so as to reproduce the third video content data during the period from the end of the first video content data being played to the start of the second broadcast program.

11. The control method of the receiving apparatus according to claim 10,
wherein the obtaining control step controls the content data obtaining unit so as to obtain from the content data server through the second transmission path, as the third video content data, a video content data having a time length equal to the difference between the broadcast ending time of the first broadcast program and the reproduction ending time of the first video content data.

12. The control method of the receiving apparatus according to claim 8,
wherein in the case where the first video content data being played ends later than the first broadcast program being broadcast and the second video content data having the same content as the second broadcast program cannot be obtained from the content data server through the second transmission path, then the play control step suspends the reproduction of the first video content data and switches to the reproduction of the second broadcast program at the time point of starting the second broadcast program.

13. The control method of the receiving apparatus according to claim 12,
wherein the play control step causes the user to select whether the reproduction is switched from the first video content data to the second broadcast program.

14. The control method of the receiving apparatus according to claim 12, further comprising:
a recording step of recording, in a storage unit, a suspension information required to restart the reproduction of the first video content data from a suspension point where the reproduction of the first video content data is suspended.

15. A receiving apparatus comprising:
a broadcast receiving unit which receives a broadcast signal including a first broadcast program through a first transmission path and reproduces-a broadcast program from the received broadcast signal;
a content data obtaining unit which obtains-a video content data including a first video content data having the same content as the first broadcast program from a content data server through a second transmission path that is different from the first transmission path;
a play unit which reproduces the video content data obtained by the content data obtaining unit;
a difference detection unit which detects difference between broadcast ending time at which broadcast of the first broadcast program is to be end and reproduction ending time at which reproduction of the first video content data is to be end in the case where the first video content data is being reproduced by the play unit; and
a control unit which controls the content data obtaining unit so as to obtain from the content data server through the second transmission path another video content data and controls the play unit so as to reproduce the another video content data during the period from the end of the first video content data being played to the start of a second broadcast program to be broadcast following the first broadcast program, the first and second broadcast programs being broadcast on the same broadcast channel, in the case where the first video content data being played ends earlier than the first broadcast program being broadcast.

16. A control method of a receiving apparatus including a broadcast receiving unit which receives a broadcast signal including a first broadcast program through a first transmission path and reproduces broadcast program from the received broadcast signal, a content data obtaining unit which obtains a video content data including a first video content data having the same content as the first broadcast program from a content data server through a second transmission path that is different from the first transmission path and a play unit which reproduces the video content data obtained by the content data obtaining unit,
the control method comprising:
a detection step of detecting difference between broadcast ending time at which broadcast of the first broadcast program is to be end and reproduction ending time at which reproduction of the first video content data is to be end in the case where the first video content data is being reproduced;
a obtaining control step of controlling the content data obtaining unit so as to obtain another video content data from the content data server through the second transmission path in the case where the first video content data being played ends earlier than the first broadcast program being broadcast; and
a play control step of controlling the play unit so as to reproduce the another video content data during the period from the end of the first video content data being played to the start of a second broadcast program to be broadcast following the first broadcast program, the first and second broadcast programs being broadcast on the same broadcast channel.

* * * * *